(12) United States Patent
Imoto

(10) Patent No.: US 7,212,320 B2
(45) Date of Patent: May 1, 2007

(54) IMAGE READING DEVICE

(75) Inventor: Shinji Imoto, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 972 days.

(21) Appl. No.: 09/814,721

(22) Filed: Mar. 23, 2001

(65) Prior Publication Data

US 2001/0026380 A1    Oct. 4, 2001

(30) Foreign Application Priority Data

Mar. 23, 2000 (JP) .............................. 2000-082786

(51) Int. Cl.
*H04N 1/04* (2006.01)
(52) U.S. Cl. ................ 358/497; 358/494; 358/464; 358/461
(58) Field of Classification Search ............. 358/497, 358/496, 494, 461, 464
See application file for complete search history.

(56) References Cited

U.S. PATENT DOCUMENTS

| | | | |
|---|---|---|---|
| 5,479,249 A | * | 12/1995 | Jugle et al. ................ 399/349 |
| 5,864,408 A | * | 1/1999 | Kumashiro ................. 358/461 |
| 5,930,008 A | * | 7/1999 | Nabeshima et al. ........ 358/496 |
| 5,941,519 A | | 8/1999 | Imoto et al. |
| 6,128,100 A | * | 10/2000 | Uemura et al. ............. 358/401 |
| 6,600,579 B1 | * | 7/2003 | Kumagai et al. ........... 358/474 |

FOREIGN PATENT DOCUMENTS

| | | | |
|---|---|---|---|
| JP | 9-197566 | | 7/1997 |
| JP | 11072975 A | * | 3/1999 |
| JP | 11-136436 | | 5/1999 |
| JP | 2000-50023 | | 2/2000 |

* cited by examiner

*Primary Examiner*—Aung S. Moe
*Assistant Examiner*—Heather D Gibbs
(74) *Attorney, Agent, or Firm*—Oblon, Spivak, McClelland, Maier & Neustadt, P.C.

(57) ABSTRACT

An image reading device of the present invention includes a glass platen mounted on a support member. A rotary cam, a home position sensor and so forth allow the support member to move in reciprocation in a subscanning direction. When a document is conveyed along the glass platen, the glass platen is moved in the subscanning direction together with the support member. Consequently, a reading section and the reading position of the glass platen move relative to each other, obviating black stripes and other defects ascribable to contamination.

52 Claims, 22 Drawing Sheets

IMAGE READING DEVICE

BACKGROUND OF THE INVENTION

The present invention relates to an image reading device for optically scanning a document surface to thereby output image data and more particularly to an image reading device for scanning a document being conveyed along a glass platen at a constant speed.

Image reading devices are generally classified into two types, i.e., a scanning type device including movable optics for illuminating a stationary document and a sheet-through type device including stationary optics for illuminating a moving document. Also, there are available an ordinary, analog image reading device and a digital image reading device using a CCD (Charge Coupled Device) image sensor or similar image sensor.

Today, a digital image reading system of the type moving a document over stationary optics is attracting attention because it can read even large-size documents and facilitates various kinds of image processing to follow. This type of image reading device, however, has a problem that the slit exposure range (reading exposure width hereinafter) is narrow. For example, if the reading density is 400 dpi (dots per inch), then the reading exposure width is as narrow as 25.4/400=0.0635 mm. Therefore, dust sized 0.0635 mm or above existing in the above range is read as false black data along with true data without regard to an image existing on a document. When a document is read in the presence of such dust, the dust appears in the resulting image in the form of a black stripe or similar defect.

An analog image reading system, whether it is of the scanning type or of the sheet-through type, illuminates a document over a slit width of 5 mm to 10 mm. In such a slit width, a latent image is not formed on a photoconductive element if the photoconductive element and a document are not moved in synchronism with each other. Therefore, dust deposited on a glass platen simply appears in an image as a black spot, which corresponds in size to the dust, in the case of the scanning system or as a blurred latent image in the case of the sheet-through system. The latent image is not conspicuous when developed.

Japanese Patent Laid-Open Publication No. 8-123157, for example, discloses an image reading device in which a document is conveyed while being spaced above a glass platen in order to prevent dust from depositing or staying in an illuminating section. Even this kind of image reading device cannot fully obviate the deposition of dust on the glass platen because the leading edge and trailing edge of a document contact the glass platen.

Technologies relating to the present invention are also disclosed in, e.g., Japanese Patent Laid-Open Publication Nos. 9-197566, 11-136436 and 2000-50023.

SUMMARY OF THE INVENTION

It is an object of the present invention to provide a digital, sheet-through type of image reading device capable of reducing black stripes or similar defects ascribable to dust deposited on a glass platen and thereby outputting desirable image data.

In accordance with the present invention, an image reading device for reading a document being conveyed with a stationary reading section at a reading position on a glass platen includes a white plate positioned above the glass platen for constituting a white reference for reading the document. A moving device moves the glass platen. A controller causes the moving device to move the glass platen while the reading section reads an image. While causing the moving device to move the glass platen, the controller causes the reading section to read an image, determines whether or not contamination is present on the basis of resulting image data, and distinguishes the contamination of the glass platen and that of the white plate.

Also, in accordance with the present invention, an image reading device for reading a document being conveyed with a stationary reading section at a reading position on a glass platen includes a body, a moving device for moving the glass platen, and a cleaning member affixed to the body and contacting the glass platen for cleaning the top of the glass platen. While the moving device moves the glass platen, the cleaning member moves relative to the glass platen to thereby clean the top of said glass platen.

Further, in accordance with the present invention, an image reading device for reading a document being conveyed with a stationary reading section at a reading position on a glass platen, includes a contact image sensor for reading an image. A press roller conveys a document while pressing it against the contact image sensor, and constitutes a white reference. A sheet pay-out member pays out a transparent sheet held between the contact image sensor and the press roller and used to lay the document thereon. A sheet take-up member takes up the transparent sheet paid out. A controller causes the sheet pay-out member to pay out the transparent sheet during reading of the document. The controller causes the contact image sensor and the reading position of the transparent sheet to move relative to each other while causing the reading section to read an image.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENTS

Preferred embodiments of the document reading device in accordance with the present invention will be described hereinafter.

First Embodiment

Figure 1:
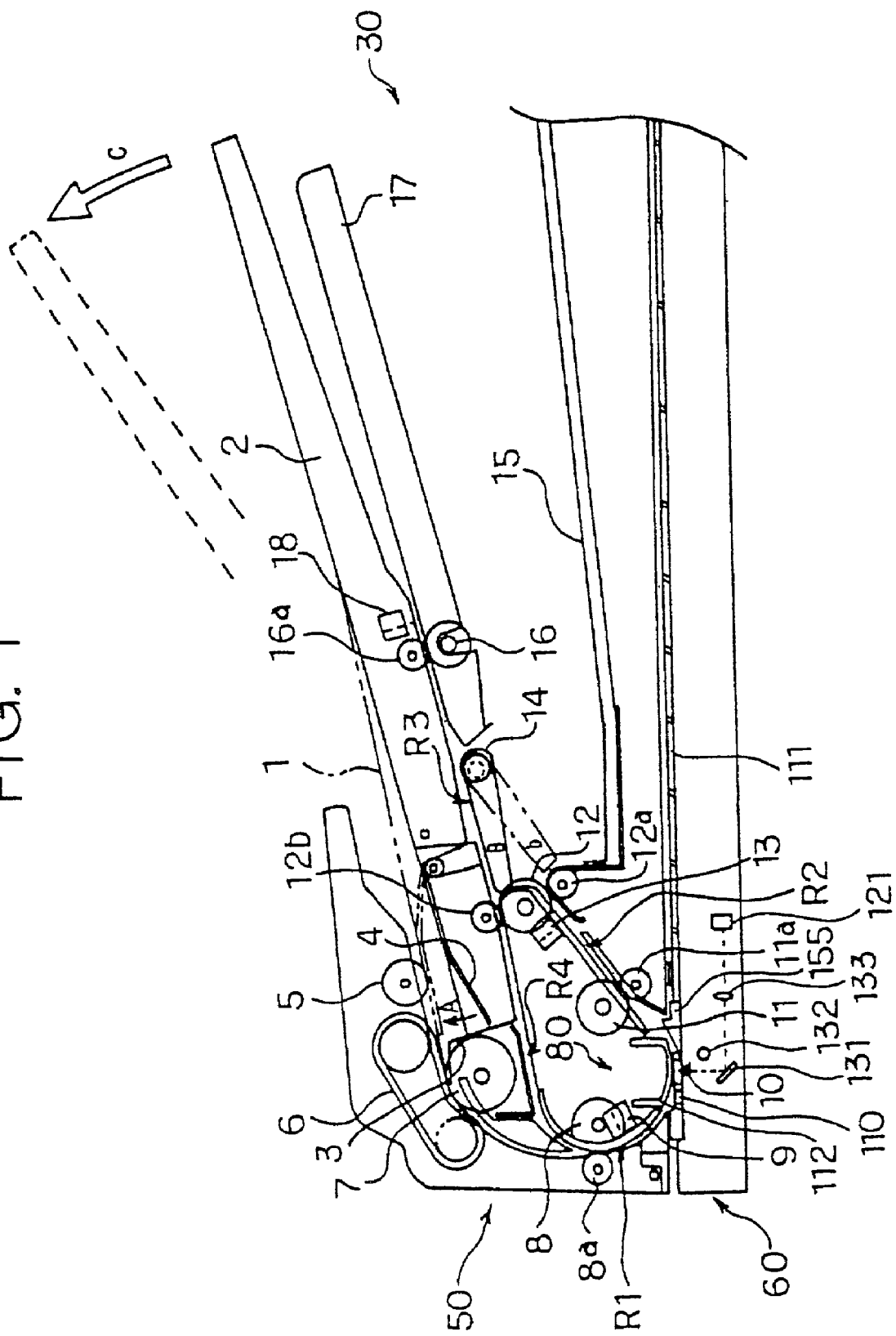
FIG. 1 is a view showing a first embodiment of the image reading device in accordance with the present invention.

Referring to FIG. 1 of the drawings, a document reading device embodying the present invention is shown and generally designated by the reference numeral 30. As shown, the image reading device 30 is generally made up of a device body 60 and an ADF 50. The device body 60 includes a reading section 80. The ADF 50 includes a document tray 2, a guide 3, a bottom plate 4, a pickup roller 5, a feeding member 6, a separator roller 7, a drive roller 8, a driven roller 8a, a registration sensor 9, an intermediate drive roller 11, an intermediate driven roller 11a, a discharge drive roller 12, a lower discharge driven roller 12a, an upper discharge driven roller 12b, a discharge sensor 13, a path selector 14, a tray 15, a reverse drive roller 16, a reverse driven roller 16a, an intermediate tray 17, and a reversal sensor 18. The ADF 50 additionally includes a first path R1, a second path R2, a third path 3, and a fourth path R4. Documents 1 are stacked on the document tray 2.

The reading section 80 includes a lamp 132 and a first mirror 131 arranged below a glass platen 111 and movable in a right-and-left direction, as viewed in FIG. 1, for reading a document laid on the glass platen 111. On the other hand, to read a document being conveyed along a glass platen 110, the lamp 132 and first mirror are held in a halt at a reading position 10 below the glass platen 110. When the lamp 132 illuminates a document, the resulting reflection from the document is incident to a CCD image sensor or similar image sensor 121 via the first mirror 131 and a lens 133. The reading section 80 additionally includes a guide 112.

Figure 2:
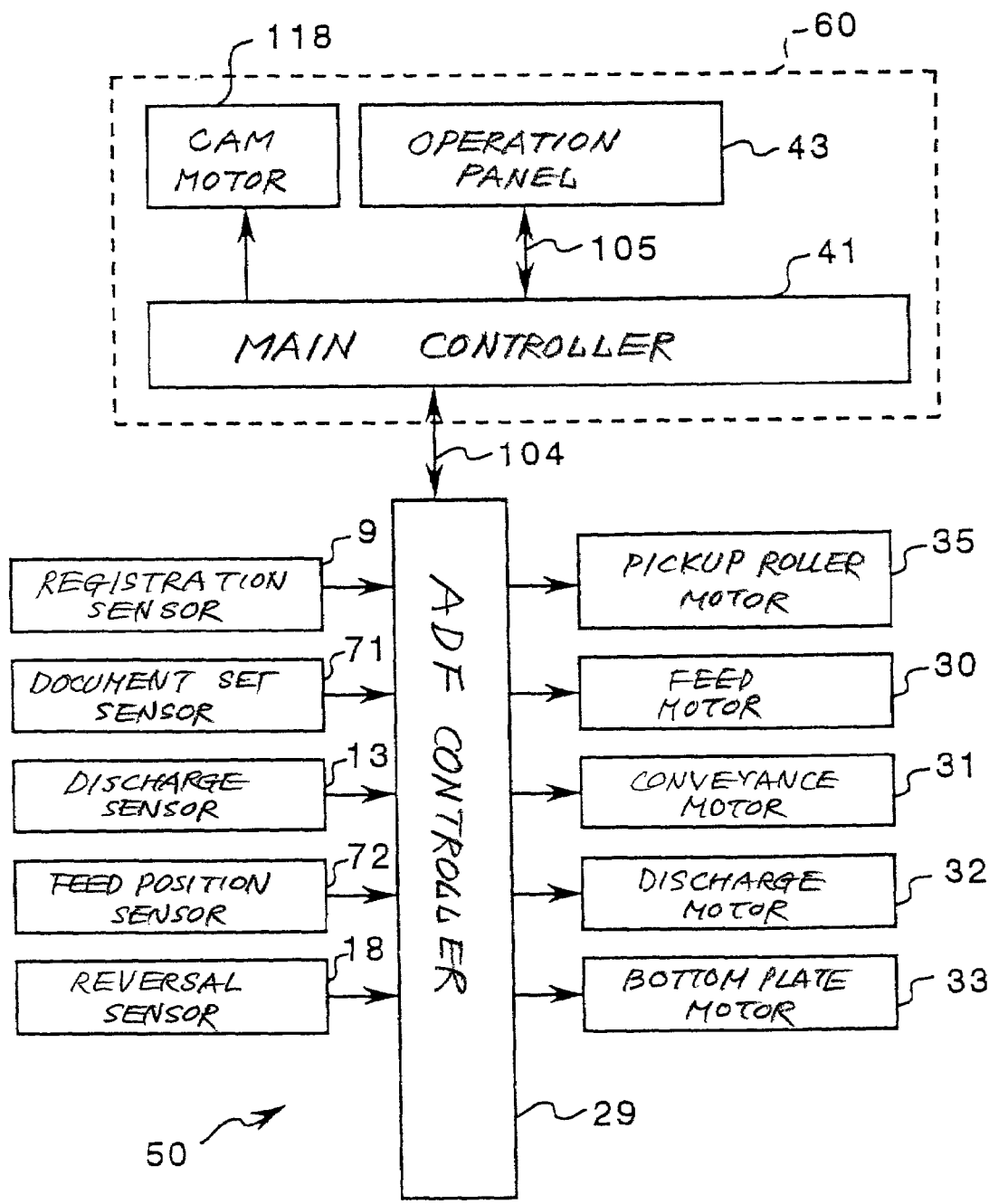
FIG. 2 is a schematic block diagram showing a control system included in the illustrative embodiment.

As shown in FIG. 2, the device body 20 accommodates a main controller 41 for controlling the entire reading device 30. The main controller 41 interchanges signals with an ADF controller 29 via communicating means 104, which is a serial communication line. The main controller 41 controls the drive of the reading section 80 and the display of information on an operation panel 43, which is connected to the main controller 41 via communicating means 105, in accordance with signals received from the ADF controller 29. Further, the main controller 41 sends various control signals, including mode signals and a feed start command, to the ADF controller 29. The ADF controller 29 controls the operation of the ADF 50 in accordance with the control signals. The main controller 41 is connected to a cam motor 118.

The operation panel 43 includes a start key, numeral keys and other various keys as well as a LCD (Liquid Crystal Display) panel, although not shown specifically. The operator of the image reading device can input a desired mode, a start command, a stop command and so forth on the operation panel 43, as desired.

The ADF controller 29 is built in the ADF 50. The previously mentioned registration sensor 9, a discharge sensor 13, the reversal sensor 18 also mentioned earlier, a set sensor 71 and a feed position sensor 72, as well as other various sensors, send their outputs to the ADF controller 29. A feed motor 30, a conveyance motor 31, a discharge motor 32, a bottom plate motor 33 and a pickup roller motor 35 send signals representative of their statuses to the ADF controller 29. The ADF controller 29 sends information representative of the statuses of the sensors 9, 13, 18, 71 and 72 to the main controller 41. Also, the ADF controller 29 controls the motors 30 through 33 and 35.

The main controller 41 includes a RAM (Random Access Memory) not shown. The RAM stores, e.g., an operation mode input on the operation panel 43 and updates the mode every time it is varied.

After the ADF 50 has been lowered (automatic feed mode), the documents 1 are stacked on the document tray 2 face up. When the operator presses the start button positioned on the operation panel 43, the main controller 41 sends a feed start signal to the ADF controller 29. In response, the ADF controller 29 causes the documents 1 to be sequentially fed from the tray 2, the top sheet being first. The document 1 is routed through the first path R1 toward the glass platen 110 included in the reading section 80.

More specifically, the leading edge of the stack of documents 1 abuts against the guide 3 and positioned thereby. In response to the feed start signal, a solenoid, not shown, raises the bottom plate 4 until the bottom plate 4 presses the documents 1 against the pickup roller 5. The pickup roller 5 pays out the document 1 toward the feed member 6 and separator roller 7. The feed member 6 and separator roller 7 cooperate to feed the top document 1 while separating it from the underlying documents 1.

The bottom plate 4 is lowered in a direction A on the elapse of a preselected period of time since the start of sheet feed or when the registration sensor 9, which will be described specifically later, senses the leading edge of the document 1. As a result, the pressure acting between the documents and the pickup roller 5 is cancelled. This successfully reduces, when the document 1 being paid out is a duplex document, a period of time over which the other side or second image side of the document 1 rubs itself against the one side or first image side of the underlying document 1. In the case where the bottom plate 4 is lowered on the elapse of a preselected period of time, the preselected period of time should preferably as short as possible.

If the document 1 being paid out is a simplex document not carrying an image on its second side, then the bottom plate 4 does not have to be lowered. One side or opposite sides of the document 1 can be read, as desired by the user.

The document 1 enters the first path R1 where the drive roller 8 and driven roller 8a are positioned. The registration sensor 8 senses the leading edge of the document 1. The resulting output of the sensor 8 is used to match the timing at which the leading edge of the document 1 reaches the reading section 80 and the timing at which the reading section 80 starts reading the document 80. If the document does not reach the sensor 8 on the elapse of a preselected period of time since the feed from the tray 2, the document 1 is determined to have jammed the path.

In a simplex mode for reading only the first side of the document 1, after the reading section 80 has read the document 1, the document 1 is driven out to a tray 15 via the second path R2 where the intermediate drive roller 11, intermediate driven roller 11a, discharge drive roller 12 and lower discharge driven roller 12a are positioned. Assume that the leading edge of the document 1 does not reach the outlet sensor 13, or that the trailing edge of the document 1 does not pass the discharge sensor 13 on the elapse of a preselected period of time. Then, the document 1 is determined to have jammed the path. A path selector 14 is usually held at a position B indicated by a solid line.

In a duplex mode for reading both of the first and second sides of the document 1, the document 1 having its first side read is routed through the second path R2 to the discharge sensor 13. When the discharge sensor 13 senses the leading edge of the document 1 or at a preselected time based on the output of the registration sensor 9, a solenoid, not shown, lowers the path selector 14 to a position b indicated by a phantom line. The path selector 14 therefore steers the document 1 to the third path R3 where the reverse drive roller 16 and reverse driven roller 16a are positioned. The rollers 16 and 16a convey the document 1 to the intermediate tray 17. If the document 1 does not arrive at the reverse sensor on the elapse of a preselected period of time, the document 1 is determined to have jammed the path.

Assume that a preselected period of time elapses since the trailing edge of the document 1 has passed the discharge sensor 13, i.e., a period of time necessary for the trailing edge of the document 1 to pass the discharge roller 12 and then arrive at the path selector 14 elapses. Then, the solenoid is deenergized to return the path selector 14 to the original position B. Subsequently, the reverse drive roller 16 is rotated in the opposite direction and cooperates with the reverse driven roller 16a to convey the document 1 to a nip between the discharge roller 12 and the upper discharge driven roller 12b. At this instant, the discharge drive roller 12 is held in a halt so as to correct the skew of the document 1. Thereafter, the discharge drive roller 12 and upper discharge driven roller 12b cooperate to convey the document 1 into the fourth path R4. Consequently, the document 1 is routed through the fourth path R4 and again through the first path R1 to the reading section 80. The reading section 80 reads the second side of the document 1.

Assume that the document 1 having its second side read by the reading section 80 is directly driven out to the tray 15 via the second path R2. Then, the document 1 is stacked on the tray 15 with its second side facing downward. This prevents the consecutive documents 1 from being stacked on the tray 15 in order of page. In the illustrative embodiment, the document 1 moved away from the reading section 80 is introduced into the second path R2. At this instant, the path selector 14 is lowered to the position b and steers the document 1 into the third path R3. As a result, the document 1 is driven out to the intermediate tray 17 via the third path R3. Subsequently, the path selector 14 is again raised to the position B. The document is therefore driven out to the tray 15 via the fourth path R4, first path R1, and second path R2.

The next document 1 starts being paid out in response to a signal fed from the main device body 60. However, raising the bottom plate 4 in response to the above signal wastes time. In the illustrative embodiment, to prevent productivity from falling, the bottom plate 4 is raised when the registration sensor 9 senses the leading edge of the preceding document 1 having been routed through the fourth path R4. Of course, the bottom plate 4 may be raised any time between the time when the trailing edge of one document 1 moves away from the pickup roller 5 and the time when the next document 1 starts being paid out. However, the bottom plate 4 should be raised when image reading is not under way in order to obviate noise.

Figure 3:
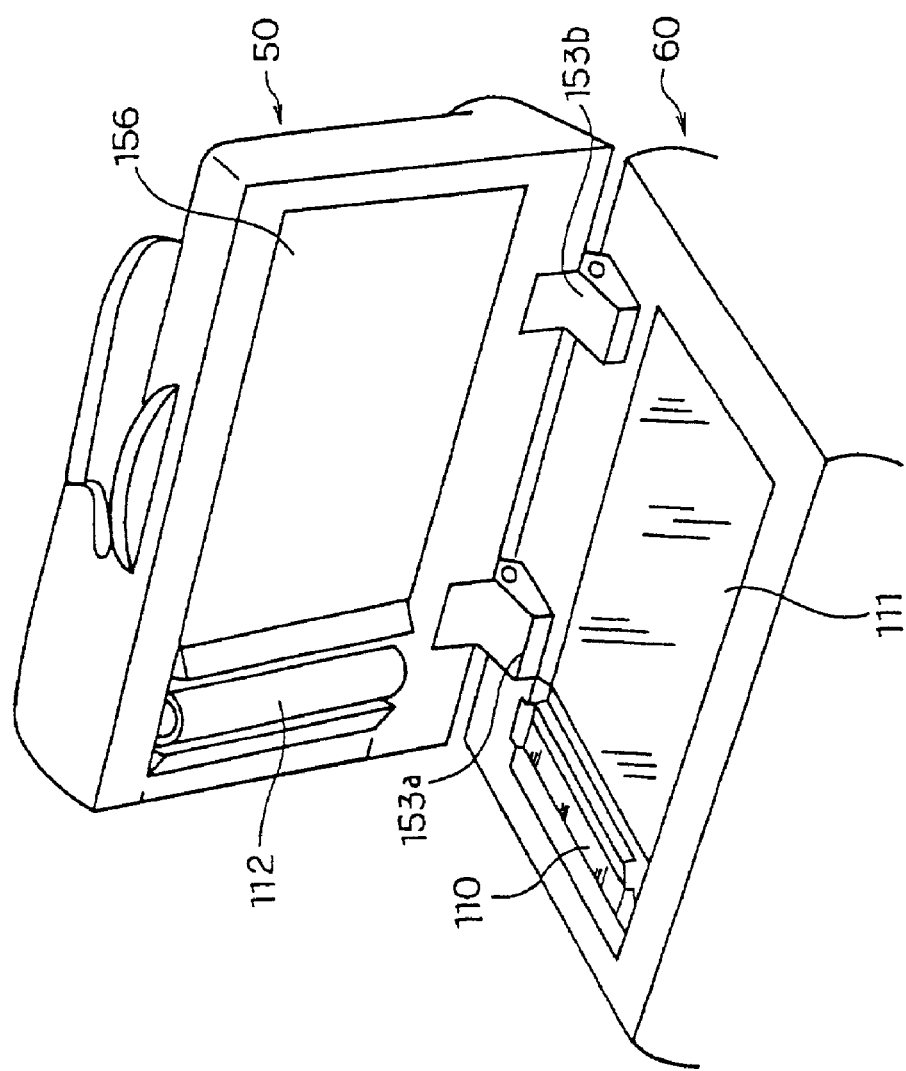
FIG. 3 is an isometric view showing the illustrative embodiment with an ADF (Automatic Document Feeder) thereof being lifted up.

FIG. 3 shows the image reading device 30 with the ADF 50 held in a lifted position. As shown, the ADF 50 is openably mounted to the device body 60 by hinges or similar connecting members 153a and 153b. In a cover plate mode, the ADF 50 is lifted up, as illustrated. After a document, which may be a sheet document or a spread book document, has been laid on the glass platen 111, the ADF 50 is lowered until a white, cover member 156 mounted on the bottom of the ADF 50 rests on the document. A white, guide member 112 is additionally mounted on the bottom of the ADF 50 while a positioning guide member is mounted on the device body 60 between the glass platens 110 and 111.

Figure 4:
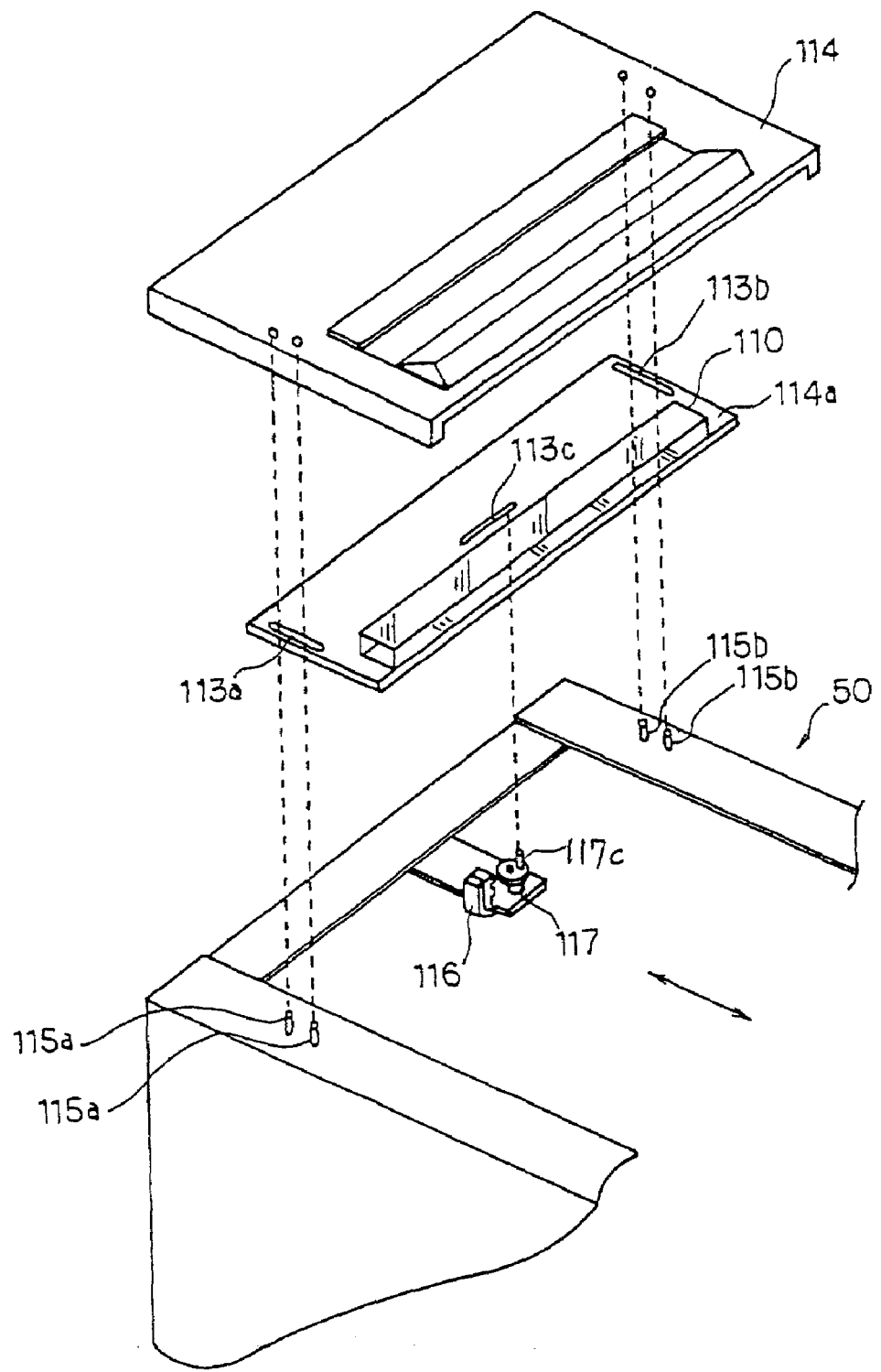
FIG. 4 is an exploded isometric view showing how a glass platen is mounted in the illustrative embodiment.

FIG. 4 shows a specific structure in which the glass platen 110 is movably mounted on the device body 60. As shown, the glass platen 110 is affixed to a support plate 114a. A pair of slots 113a and 113b are formed in opposite end portions of the support plate 114a. Two positioning pins 115a and two positioning pins 115b are studded on the device body 60 and received in the slots 113a and 113b, respectively. A rotary cam 117 is mounted on the device body 60 while a pin 117c is studded on the cam 117. The pin 117c is received in a slot 113c also formed in the support plate 114a. In this configuration, when the cam 117 is rotated, it causes the support member 114a to slide by being guided by the pins 115a and 115b only in the subscanning direction, which is indicated by a double headed arrow in FIG. 4.

Figure 5:
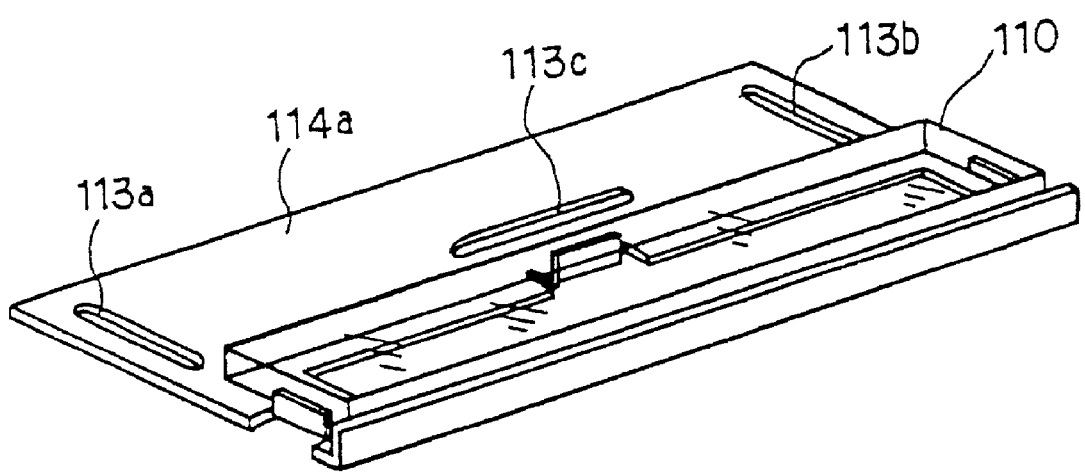
FIG. 5 is an isometric view showing a support member to which the glass platen is mounted.

A cover or affixing member 114 is mounted to the device body 60 in such a manner as to cover the support plate 114. As shown in FIG. 5, the support plate 114a is implemented by a sheet metal that retains the glass platen 110 with its frame portion. In FIG. 4, the reference numeral 116 designates a home position sensor responsive to the home position of the glass platen 110, as will be described specifically later.

Figure 6:
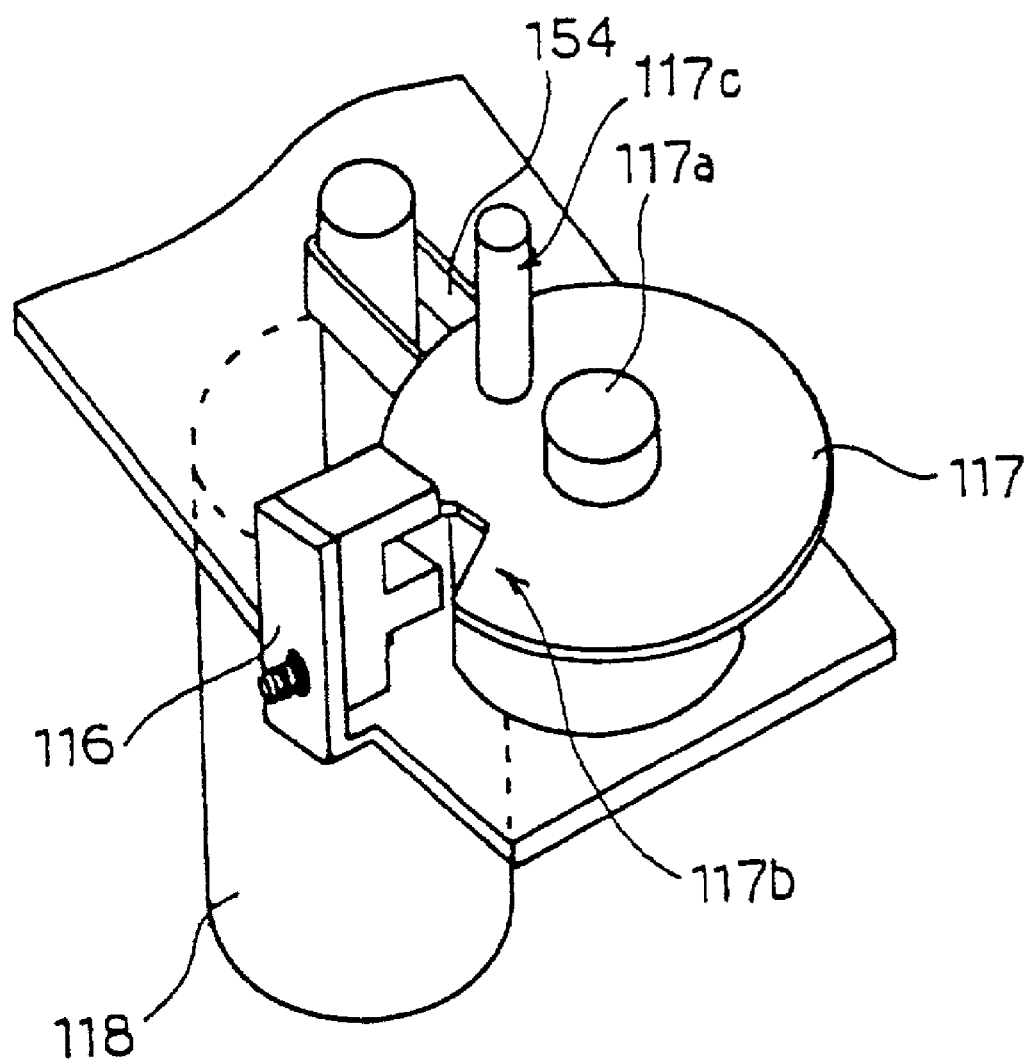
FIG. 6 is a view showing a drive member for causing the glass platen to move.
Figure 7:
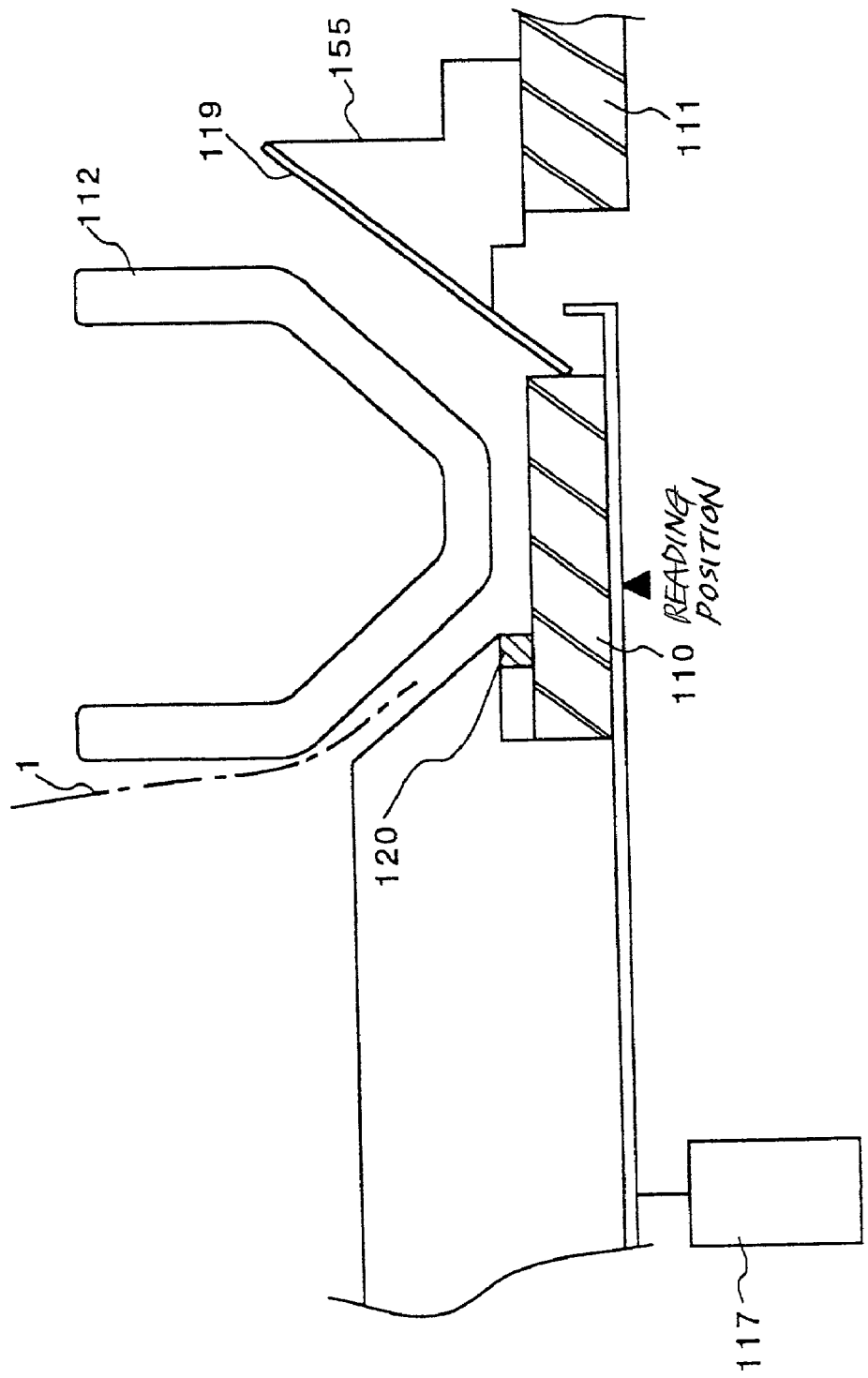
FIG. 7 is a view showing arrangements around the glass platen.

As shown in FIG. 6, the cam 117 that drives the support member 114a is positioned below the support member 114a. The main controller 41, FIG. 2, drives the cam motor 117. The cam motor 117 causes the cam 117 to rotate about a shaft 117a via a timing belt 154. The rotation of the cam 117 is transferred to the support member 114 via the pin 117c and the slots 113c formed in the support member 114, allowing the support member 114 to move back and forth in the subscanning direction. A notch 117b is formed in the cam 117. When the previously mentioned home position sensor 116 senses the notch 117b, it is determined that the glass platen 110 is in its home position. FIG. 7 shows the home position of the glass platen 110.

As shown in FIG. 7, a stepped scoop-up guide 155 is positioned downstream of the glass platen 110 in the direction of document conveyance. A Mylar sheet or similar flexible member 119 is fitted on the upper surface of the scoop-up guide 155 and contacts the downstream edge of the glass platen 110 at one edge thereof, as illustrated. For the flexible member 119, use may be made of a polyester film or a rubber member whose surface is coated with Teflon. The coefficient of friction between such a film or rubber member and the document 1 is smaller than the coefficient of friction between the other conveying members and the document 1. The reference numeral 120 designates a cleaning member.

Figure 8:
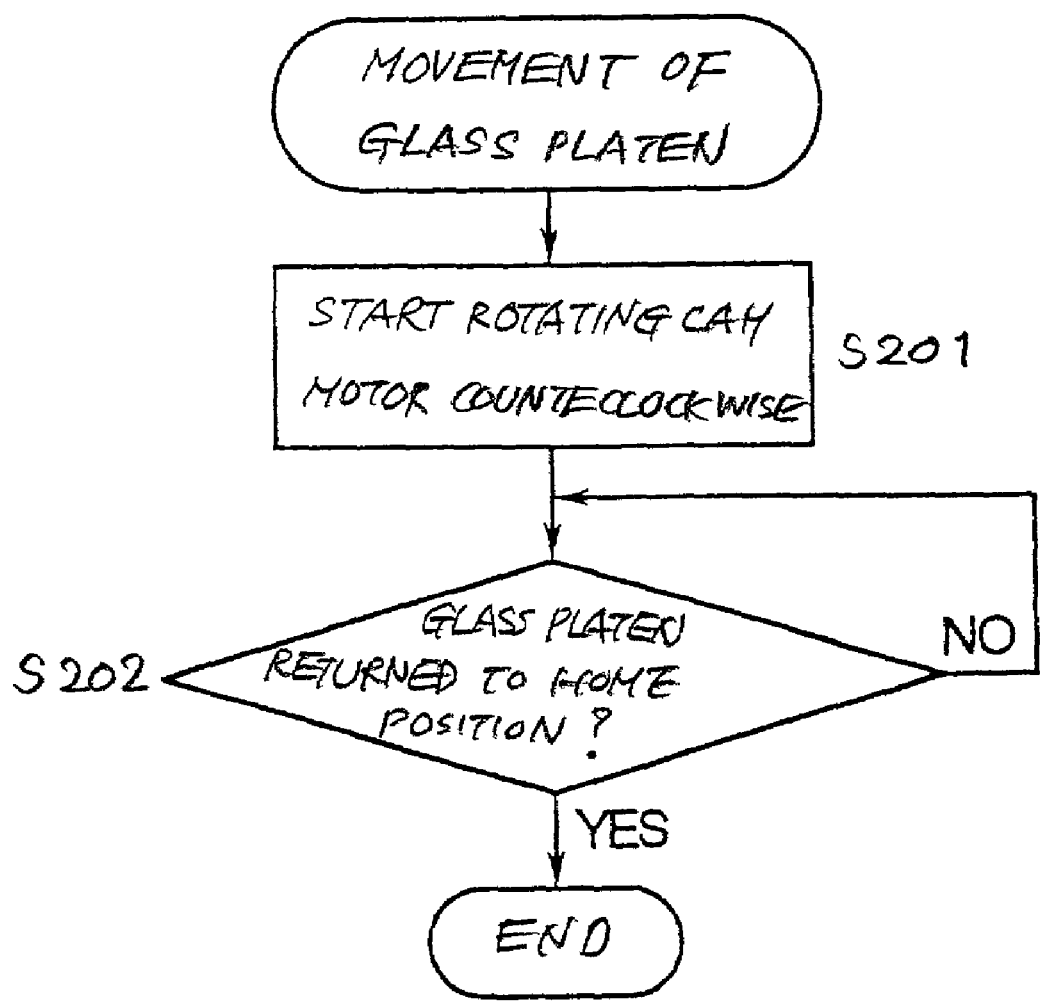
FIG. 8 is a flowchart demonstrating a procedure for moving the glass platen.
Figure 9:
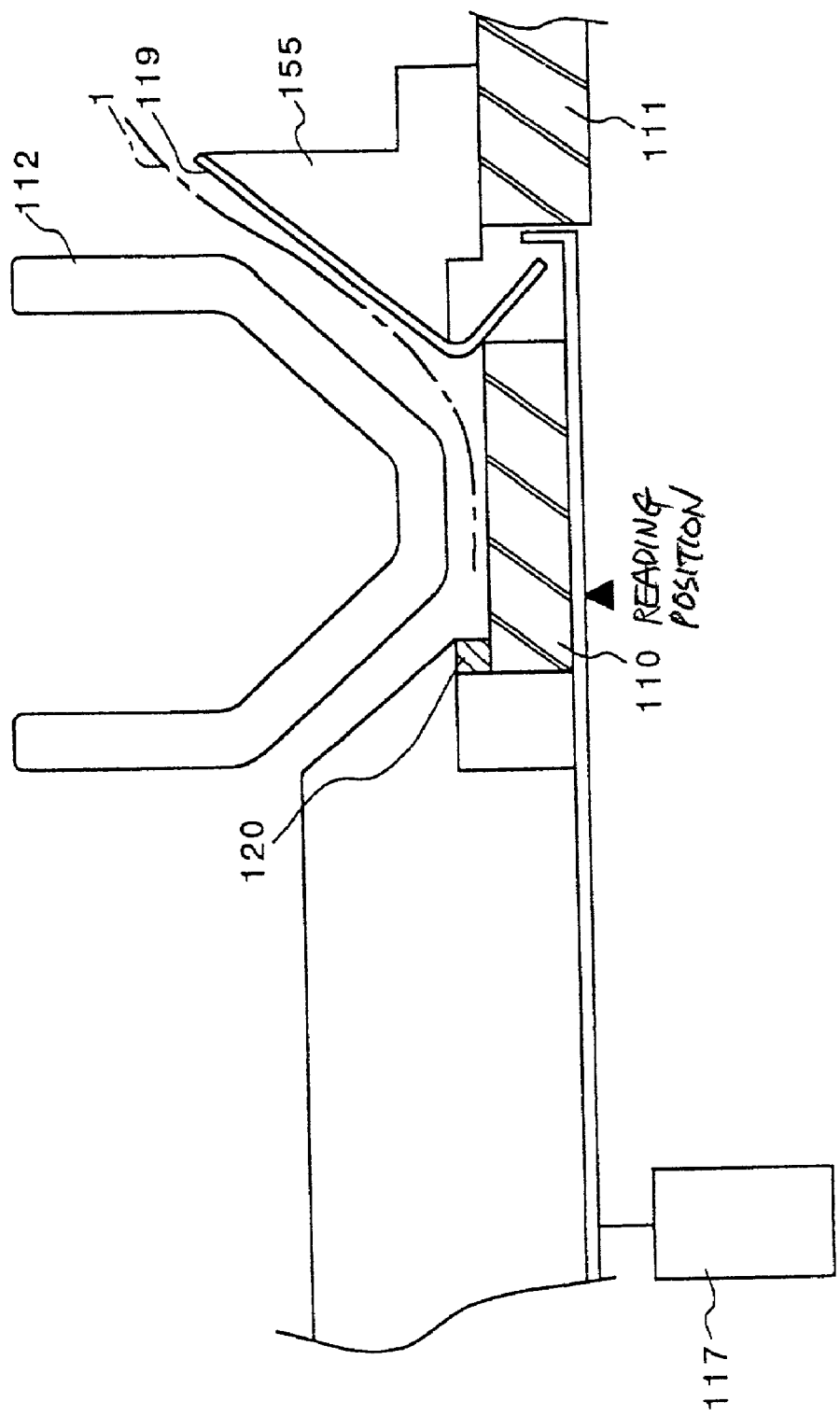
FIG. 9 is a view also showing the arrangements around the glass platen.

FIG. 8 shows a specific procedure for moving the glass platen 110. As shown, as soon as the registration sensor 9 senses the leading edge of the document 1, the main controller 41 starts counting drive pulses fed to rotate the drive roller 8. Subsequently, when the leading edge of the document 1 reaches the scoop-up guide 155, the main controller 41 sends a glass platen move signal to the cam motor 118. In response, the cam motor 118 starts rotating clockwise (step S201). The cam motor 118 causes the glass platen 110 to move from the home position shown in FIG. 7 to a position shown in FIG. 9 and then return to the home position via the cam 117. When the home position sensor 116 senses the notch 117b, the main controller 41 determines that the glass platen 110 has returned to the home position, and stops driving the cam motor 118.

A single reciprocation of the glass platen 110 described above completes in a preselected period of time X (second) by a single drive of the cam motor 118. For example, assume that an A4 landscape document is fully illuminated in 1 second. Then, when such a document is illuminated, the cam motor 118 is driven to make half a rotation in about 1 second. The cam motor 118 therefore causes the glass platen 110 to move in the same direction as the document during illumination. This prevents contamination on the glass platen 110 from staying at the illuminating position. Moreover, the illuminating position can be set in the range of the glass platen 110 that can be automatically cleaned. After the cam motor 118 has made half a rotation, it is caused to make another half a rotation without regard to the preselected number of rotations, returning to its home position. At this instant, the cam motor 118 should preferably be rotated at a higher speed than when it moves the glass platen 110 in the same direction as the document. By the above rotation, the cam motor 118 is prepared for the next document feed.

The cleaning member 120 constantly contacts the glass platen 110 and automatically cleans the glass platen 110 every time the glass platen 110 moves. Further, when the glass platen 110 moves from the position of FIG. 7 to the position of FIG. 9, the flexible member 119 is elastically deformed by the glass platen 110 and therefore does not obstruct the movement of the glass platen 110.

Figure 10:
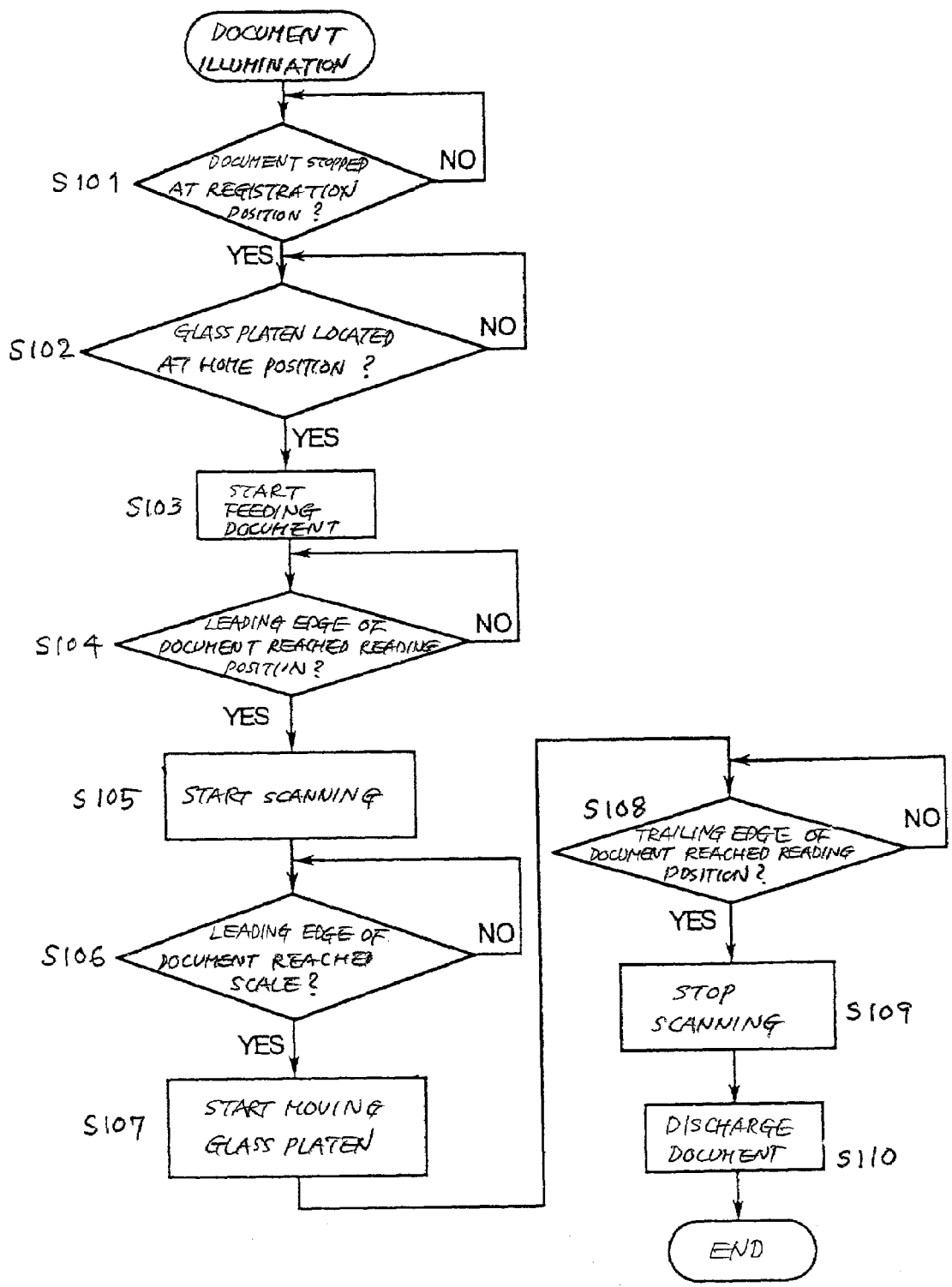
FIG. 10 is a flowchart demonstrating a specific image reading operation available with the illustrative embodiment.

A specific operation of the illustrative embodiment for reading the document 1 will be described hereinafter with reference to FIG. 10. When the document 1 is paid out from the document tray 2 in the ADF mode, the conveyance motor 31 drives the drive roller 8. The drive roller 8 cooperates with the driven roller 8a to convey the document 1 toward the glass platen 110 via the first path R1. At this instant, the main controller 41 determines whether or not the leading edge of the document 1 has been stopped for registration on the basis of the output of the registration sensor 9 (step S101). If the answer of the step S101 is YES, then the main controller 41 determines whether or not the glass platen 110 is located at its home position by referencing the output of the home position sensor 116 (step S102). If the answer of the step S102 is YES, then the main controller 41 causes the document 1 to be conveyed to the illuminating position or reading position (step S103).

Subsequently, the main controller 41 determines, based on the number of pulses fed to drive the drive roller 8, whether or not the leading edge of the document 1 has reaches the illuminating position (step S104). If the answer of the step S104 is YES, then the main controller 41 causes the reading section 80 to illuminate the document 1 by the sheet-through system (step S105). More specifically, the document 1 conveyed by the drive roller 8 and driven roller 8a is guided by the guide 112 and passes the glass platen 111 at a preselected speed. At this instant, while the lamp 132 illuminates the document 1, the resulting reflection from the document 1 is incident to the image sensor 121 via the mirror 131 and lens 133.

The leading edge of the document 1 is scooped up by the scoop-up guide 155 and further conveyed. The main controller 41 determines whether or not the leading edge of the document 1 has reached the above guide 155, or scale, on the basis of the number of pulses that drive the drive roller 8 (step S106). If the answer of the step S106 is YES, the main controller 41 starts moving the glass platen 110 (step S107). Specifically, the main controller 41 rotates the cam 117 via the cam motor 118 such that the support plate 114a and therefore the glass platen 110 moves in the same direction as the document 1, i.e., in the subscanning direction. The glass platen 110 should preferably continuously move in the above direction until the entire document 1 has been scanned.

Subsequently, the main controller 41 determines whether or not the trailing edge of the document 1 has reached the illuminating position (step S108). If the answer of the step S108 is YES, the main controller 41 causes the reading section 80 to end the scanning operation (step S109). When a single drive of the cam 117 is coincident with a single document reading operation, the return of the glass platen 110 follows due to the drive of the cam 117. The home position sensor 116 senses the notch 117b of the cam 117 when the trailing edge of the document 1 reaches the scoop-up guide or scale 155, as determined in terms of the number of drive pulses.

Finally, the intermediate drive roller 11, intermediate driven roller 11a, discharge drive roller 12 and lower discharge driven roller 12a cooperate to discharged the document 1 to the tray 15 (step S110). The glass platen 110 is returned to its home position to prepare for the next document. The main controller 41 allows the next document 1 to be conveyed to the exposing position when determining that the glass platen 110 has returned to its home position.

As stated above, the glass platen 110 moves in the same direction as the document 1 every time the document is read. The document 1 is therefore illuminated at a different position of the glass platen 110 at all times. It follows that dust or similar impurity, which may deposit on the glass platen 110, prevents image quality from being degraded by, e.g., black stripes.

Second Embodiment

Figure 11:
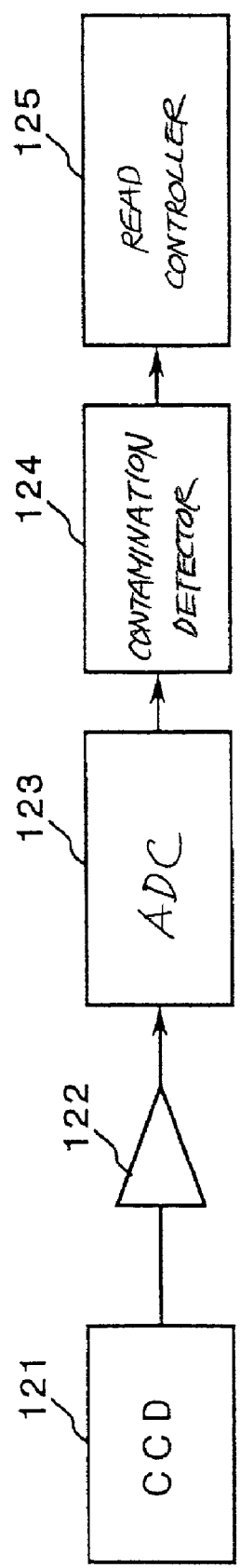
FIG. 11 is a schematic block diagram showing a control system representative of a second embodiment of the present invention.

Reference will be made to FIG. 11 for describing an alternative embodiment of the present invention, particularly a main controller thereof. This embodiment is also practicable with the arrangements shown in FIGS. 1 through 7 and 9. In the figures, identical reference numerals designate identical structural elements. As shown, the main controller includes the CCD image sensor 121, an amplifier 122, an ADC (Analog-to-Digital Converter) 123, a contamination detector 124, and a read controller 125.

Image data output from the image sensor 121 are converted to an analog signal. The amplifier 122 amplifies the analog signal and feeds the amplified analog signal to the ADC 123. The ADC 123 digitizes the analog signal to thereby produce a multilevel digital image signal. The digital image signal is input to the contamination detector 124.

Figure 12:
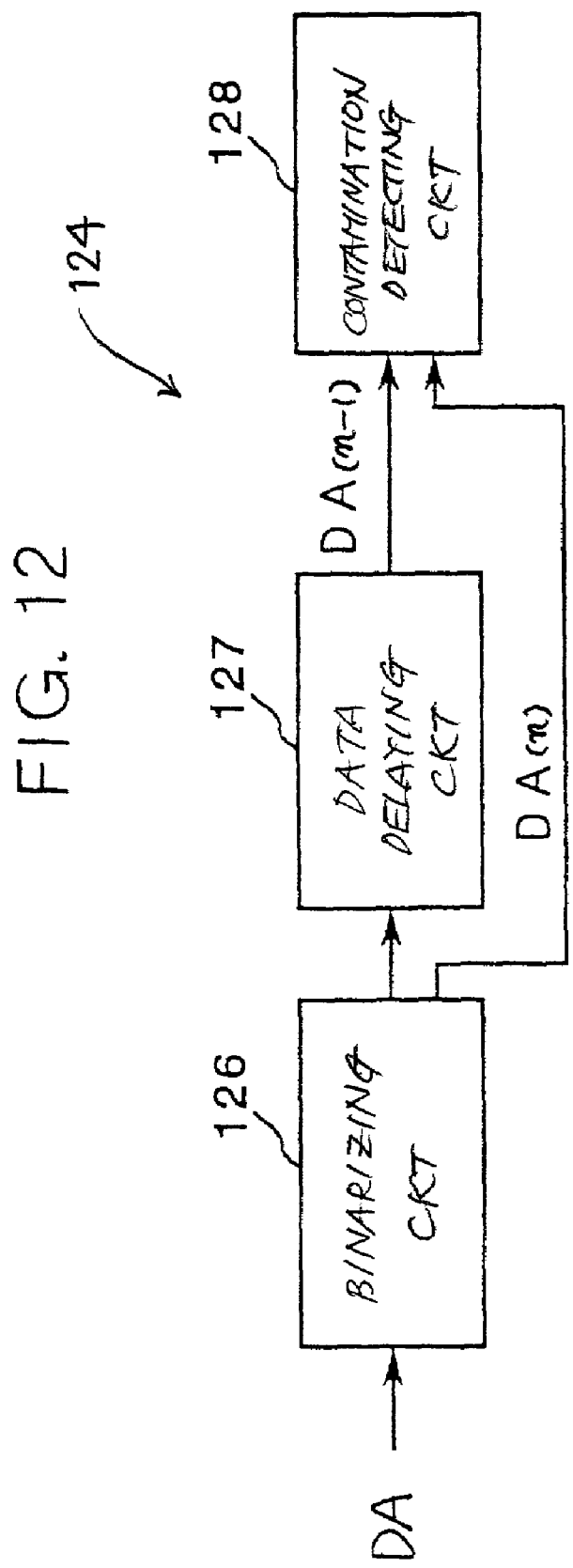
FIG. 12 is a schematic block diagram showing a specific configuration of a contamination detector included in the system of FIG. 11.

FIG. 12 shows a specific configuration of the contamination detector 124. As shown, the contamination detector 124 includes a binarizing circuit 126 for binarizing the image data, labeled DA, input from the ADC 123 by using preselected threshold data D(th). The binarizing circuit 126 outputs the resulting binary data DA(n). A data delaying circuit 127 delays the image data DA(n) by one data to thereby output delayed image data DA(n−1). A contamination detecting circuit 128 compares the current image data DA(n) output from the binarizing circuit 126 and the delay image data DA(n−1) to thereby detect the contamination of the glass platen 110. More specifically, the contamination detecting circuit 128 compares the current image data DA(n) with the image data DA(n−1) read immediately before the data DA(n). The circuit 128 then determines, based on a difference between the two data, whether or not the glass platen 110 is contaminated. At the same time, the circuit 128 determines which of the glass platen 110 and guide 112 is contaminated. The result of decision output from the circuit 128 is fed to the read controller 125.

Binarizing the image data DA is successful to protect the difference of the image data DA from errors ascribable to the irregular sensitivity of the image sensor 121, the irregular quantity of light to issue from the lamp 131, and the irregular light quantity distribution of the glass platen 110 and that of the lens 133. The image data DA is usually output with eight bits and 256 tonality levels. The threshold data D(th) is representative of a level for determining whether or not the image data DA is black.

The guide 112 contacts the side of the document 1 opposite to the image side and therefore rarely brings about black stripes or similar defects except when the document 1 is an extremely thin paper sheet having high transmission. By contrast, the glass platen 110 necessarily brings about defects when contaminated. It is therefore extremely important to distinguish the guide 112 and glass platen 110 from each other as to contamination. While the image sensor 121 may be used to sense the contamination of the glass platen 110, the image sensor 121 mainly reads the white surface of the guide 112. Therefore, to distinguish the contamination of the guide 112 and that of the glass platen 110, the following procedure is executed.

Figure 13:
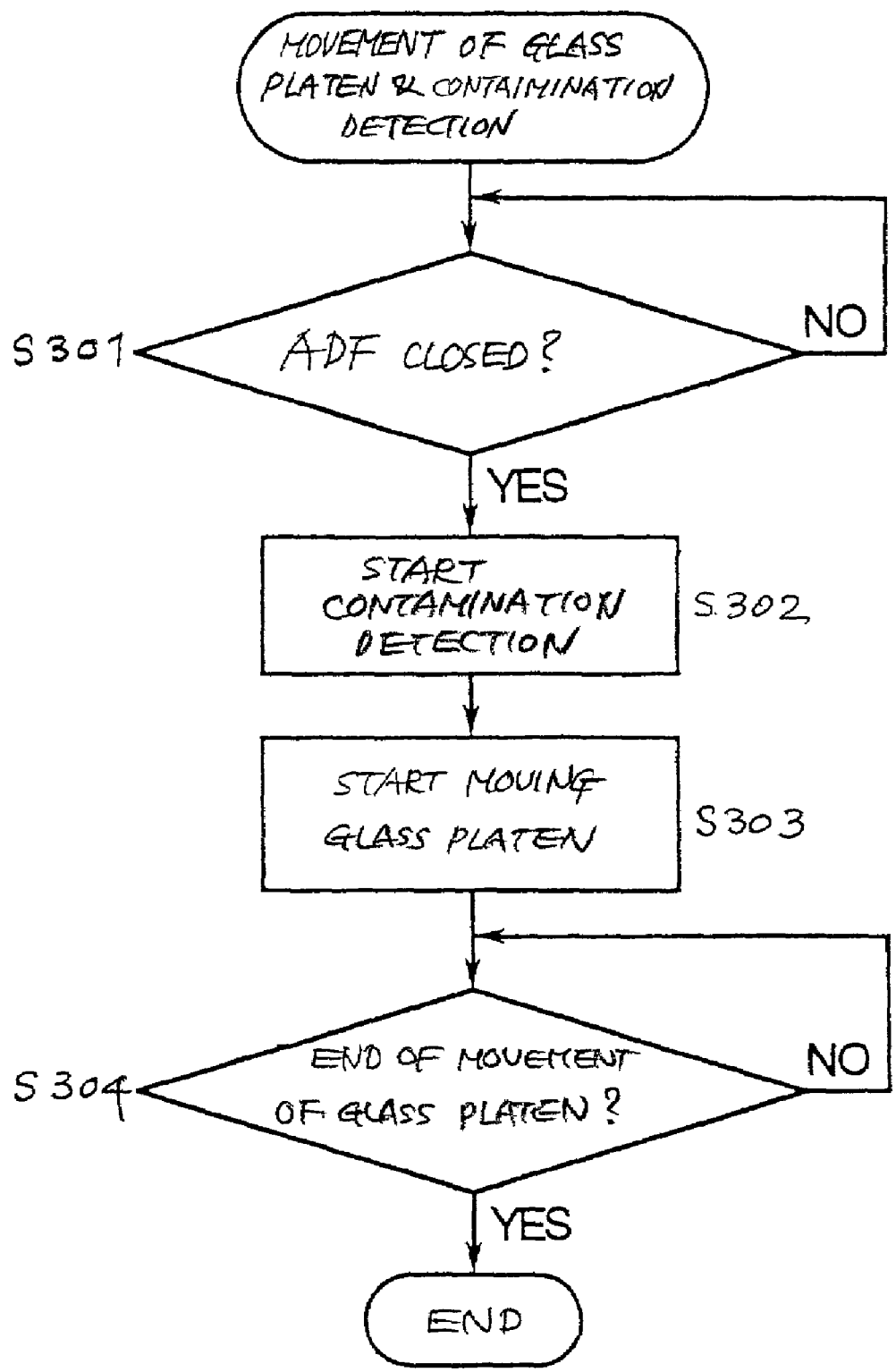
FIG. 13 is a flowchart demonstrating a procedure unique to the second embodiment for moving the glass platen and detecting contamination.

As shown in FIG. 13, to detect the contamination of the glass platen 110 with the contamination detector 124, the main controller 41 determines whether or not the ADF is closed by referencing the output of a lift-up sensor not shown (step S301). If the answer of the step S301 is YES, then the main controller 41 starts executing contamination detection. (step S302). Specifically, the main controller 41 causes the reading section 80, which is held stationary, to scan the glass platen 110 while moving the glass platen 110 via the cam 117 (step S303). The main controller 41 then determines whether or not the glass platen 110 has completed a single reciprocation (step S304). If the answer of the step S304 is YES, then the main controller 41 ends the procedure.

Figure 14:
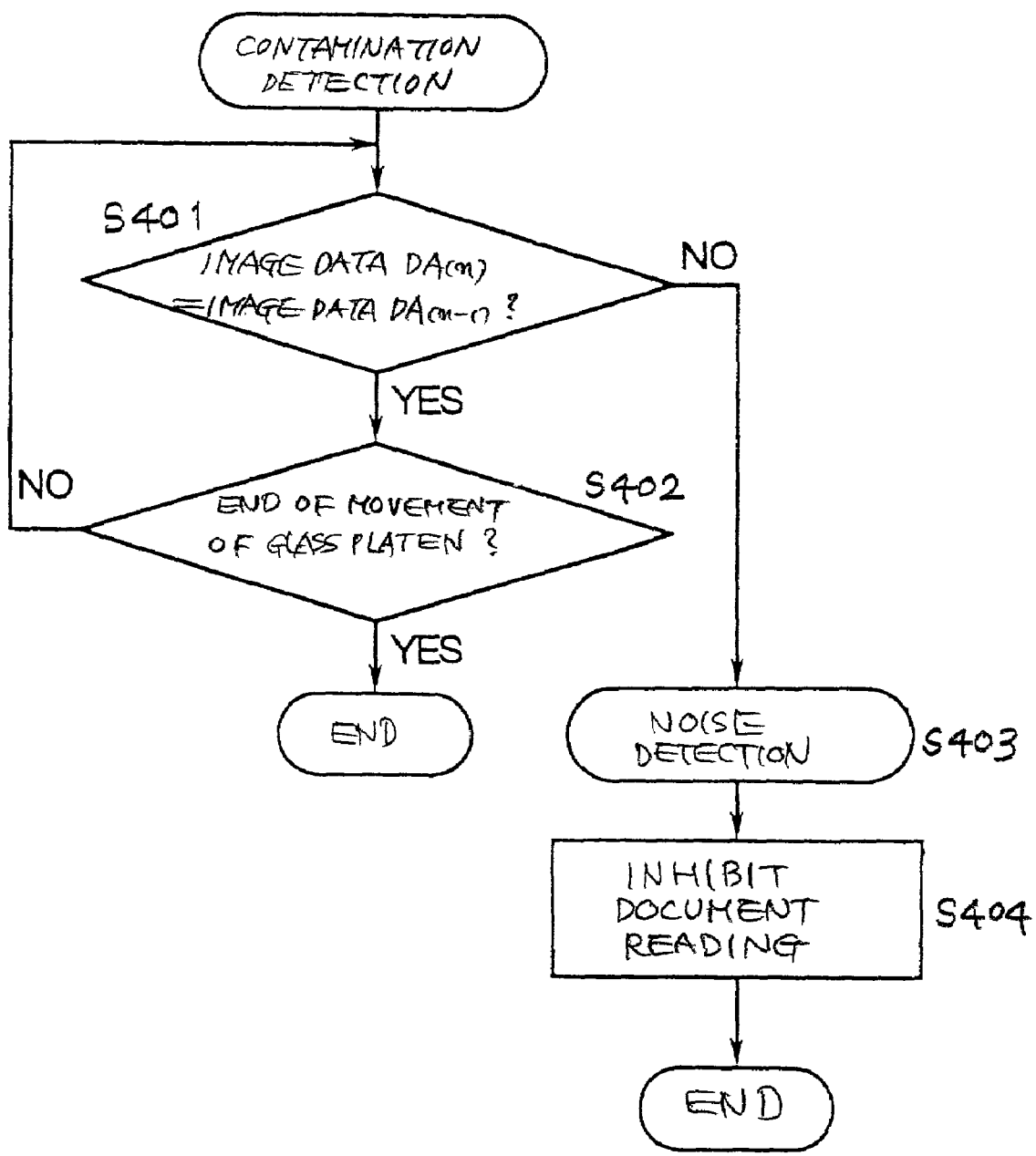
FIG. 14 is a flowchart demonstrating a procedure also unique to the second embodiment for detecting contamination.

FIG. 14 shows the step S302 of FIG. 13 in detail. As shown, the contamination detecting circuit 124 determines whether or not the current image signal DA(n) output from the ADC 123 and the immediately preceding image data DA(n−1) are identical (step S401). If the answer of the step S401 is YES, then the main controller 41 ends the procedure after the end of reciprocation of the glass platen 110 (YES, step S402). If the answer of the step S401 is NO, then the main controller 41 detects image noise (step S403). Assume that the contamination exists on the glass platen 110, and that the contamination is dust or a smear greater than a preselected size deposited on the glass platen 110. Then, the main controller 41 feeds an inhibition signal to the reading section 80 for inhibiting it from reading documents (step S404). At the same time, the main controller 41 displays an alarm message on the operation panel 43.

Whether or not to inhibit the reading section 80 from reading documents can be freely determined on the basis of the size of detected noise. The criterion for the decision may advantageously be five pixels to six pixels because frequency inhibition would annoy the operator.

Figure 15:
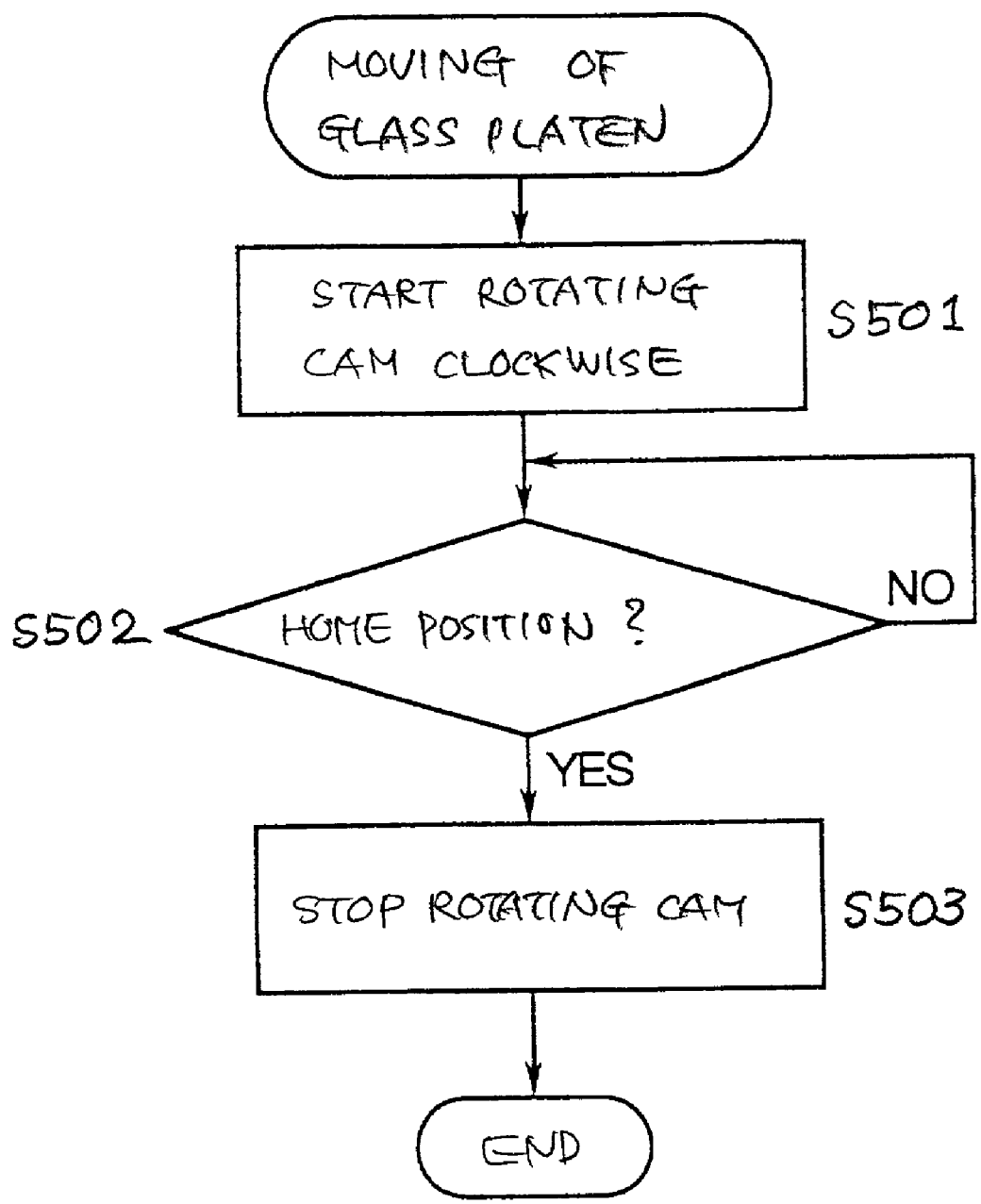
FIG. 15 is a flowchart demonstrating a procedure also unique to the second embodiment for moving the glass platen.

FIG. 15 shows the step S303 of FIG. 13 in detail. The procedure of FIG. 13 is similar to the procedure of FIG. 8 described earlier. As shown, the main controller 41 causes the cam motor 118 to rotate clockwise (step S501), so that the cam 117 causes the glass platen 110 to move forward away from its home position (step S502). The main controller 41 then returns the glass platen 110 to its home position (YES, step S502). Thereafter, the main controller 41 stops driving the motor 118 (step S503).

As stated above, the illustrative embodiment executes a reading operation while moving the glass platen 110 in order to detect contamination greater than a preselected size. Further, the illustrative embodiment determines which of the white plate or cover plate of the ADF 50 and the glass platen 110 is contaminated. It is therefore possible to urge the user to clean the glass platen 110, which is easier to clean than the cover plate.

Figure 16:
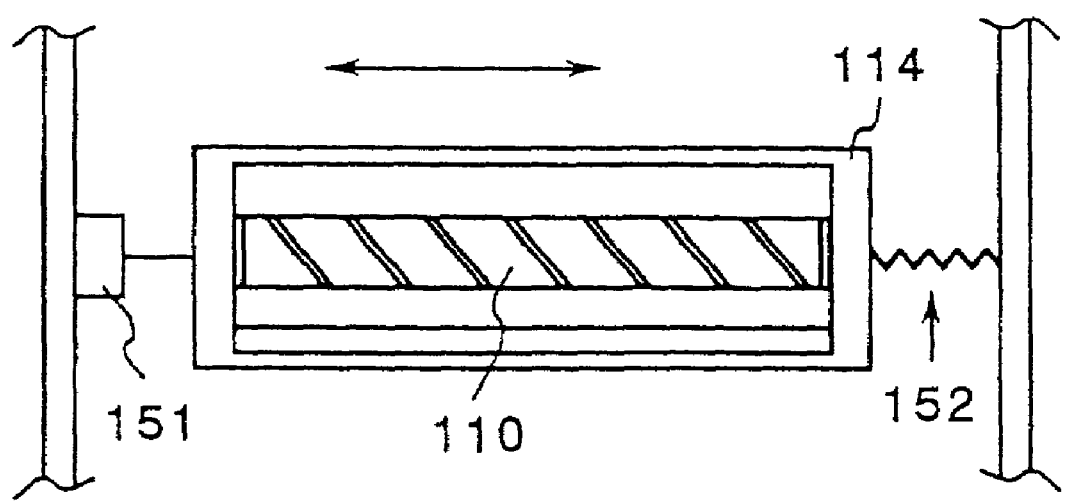
FIG. 16 is view showing a modification of the second embodiment.

The illustrative embodiment moves the glass platen 110 in the subscanning direction for detecting contamination. Alternatively, as shown in FIG. 16, the glass platen 110 may be moved in the main scanning direction, if desired. Specifically, in FIG. 16, the support member 114a is mounted on the device body 60 via slide members (e.g. slots 113c and pins shown in FIGS. 4 and 5). The support member 114a is movable in the subscanning direction, i.e., in the right-and-left direction, as seen in FIG. 16, relative to the device body 60. A spring 152 constantly biases the support member 114a toward the device body 60 at one end of the support member 114a. A solenoid 151 is capable of pulling the other end of the support member 114a. The solenoid 151 is selectively energized or deenergized to move the glass platen 110 back and forth in the main scanning direction. During the detection of contamination, no documents contact the glass platen 110, so that the detection in the main scanning direction is effective.

Third Embodiment

Reference will be made to FIGS. 17 through 20 for describing still another embodiment of the present invention, particularly arrangements around the glass platen 110. This embodiment is also practicable with the construction described with reference to FIGS. 1 through 6. In the figures, identical reference numerals designate identical structural elements.

Figure 17:
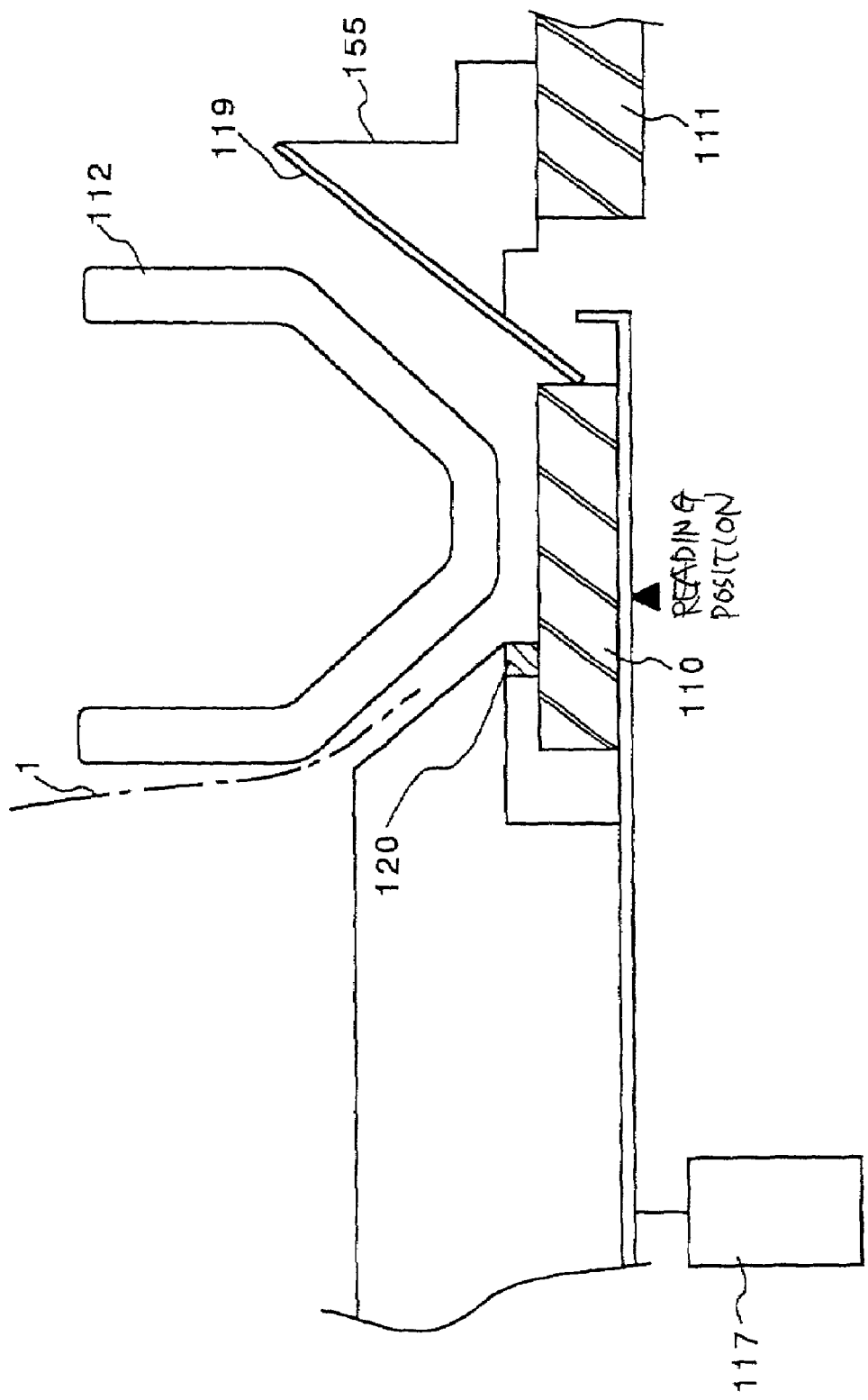
FIGS. 17 through 20 are views showing a third embodiment of the present invention.
Figure 18:
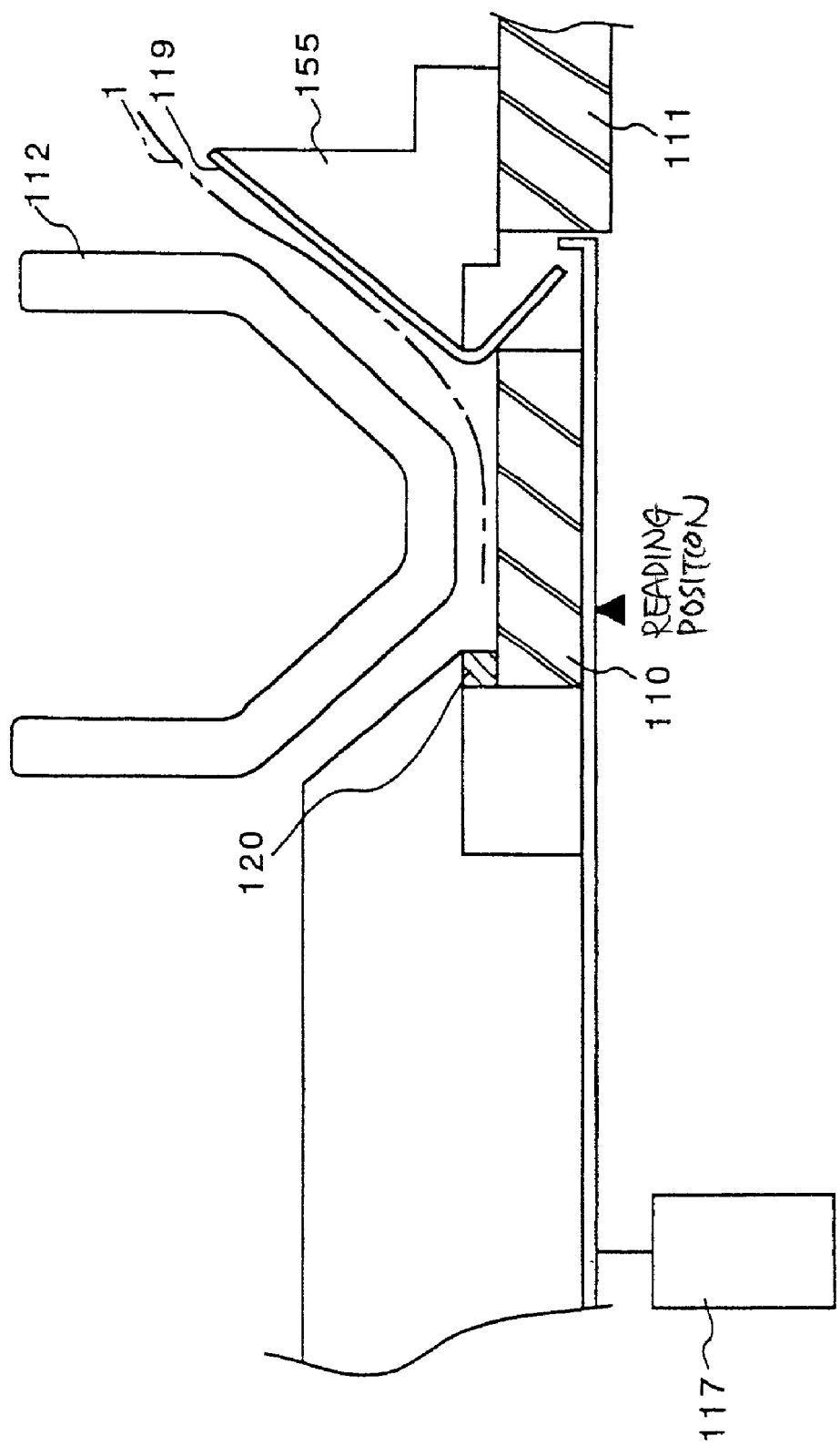
Figure 19:
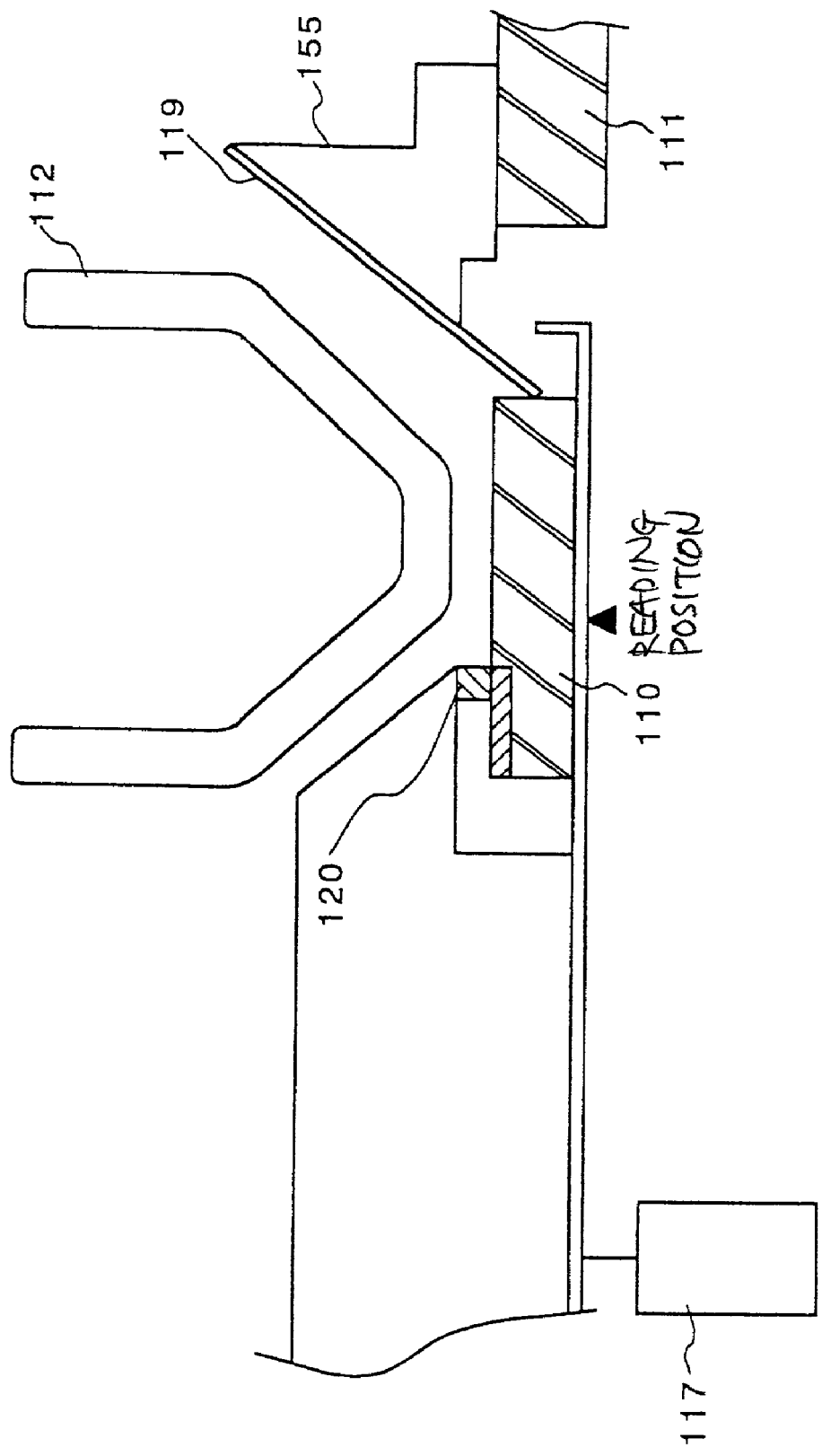
Figure 20:
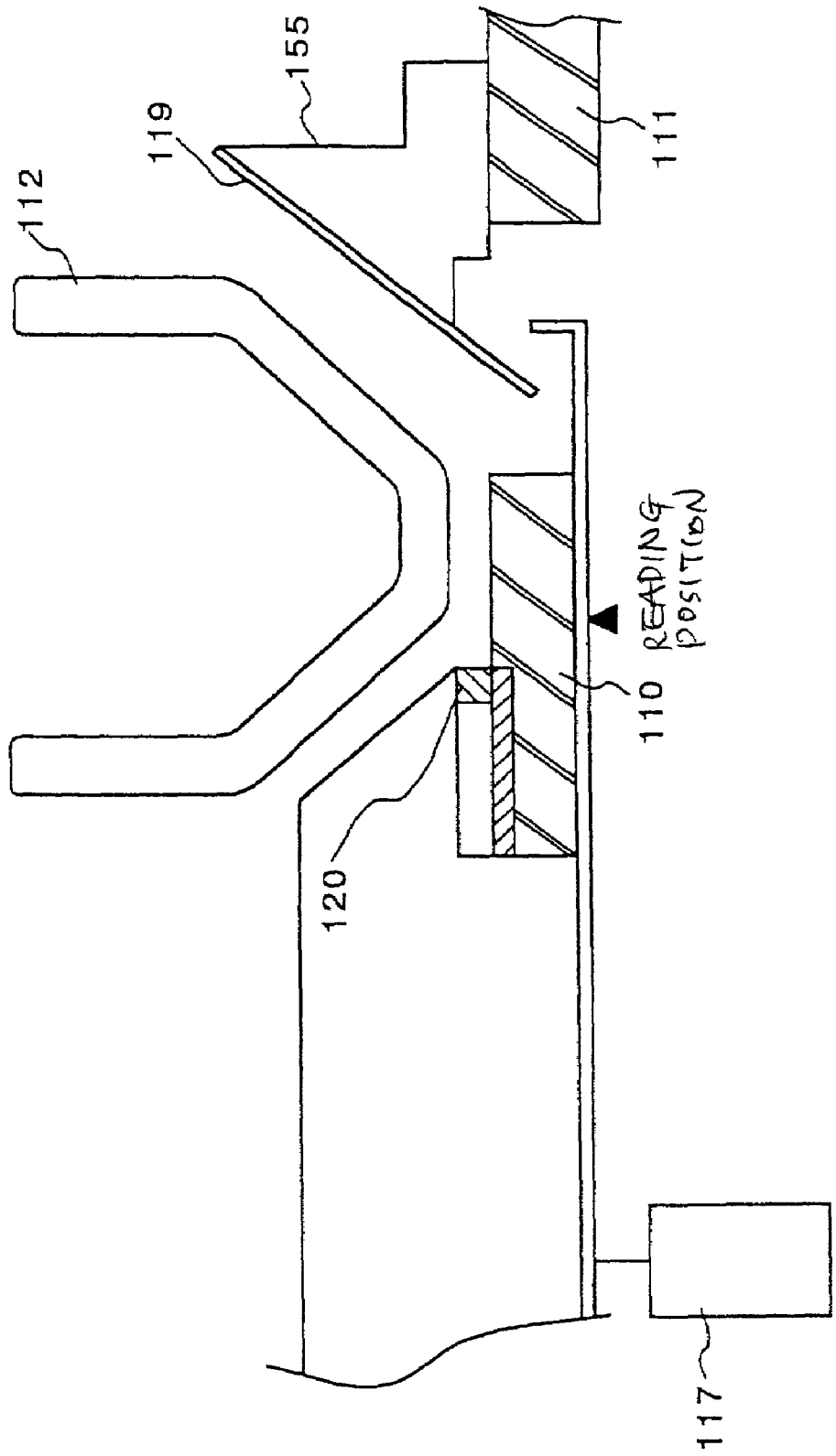

In the illustrative embodiment, the glass platen 110 is movable not only to the right, as viewed in FIG. 17, but also to the left away from the home position. The cleaning member 120 is positioned upstream of the glass platen 110 in the direction of document conveyance and held in contact with the top of the glass platen 110. The cleaning member 120 extends in the widthwise direction of the support member 114a. To protect the top of the glass platen 110 from impurities including dust, the cleaning member 120 is coated with a water-repellent agent or impregnated with a low-fiction agent.

Figure 21:
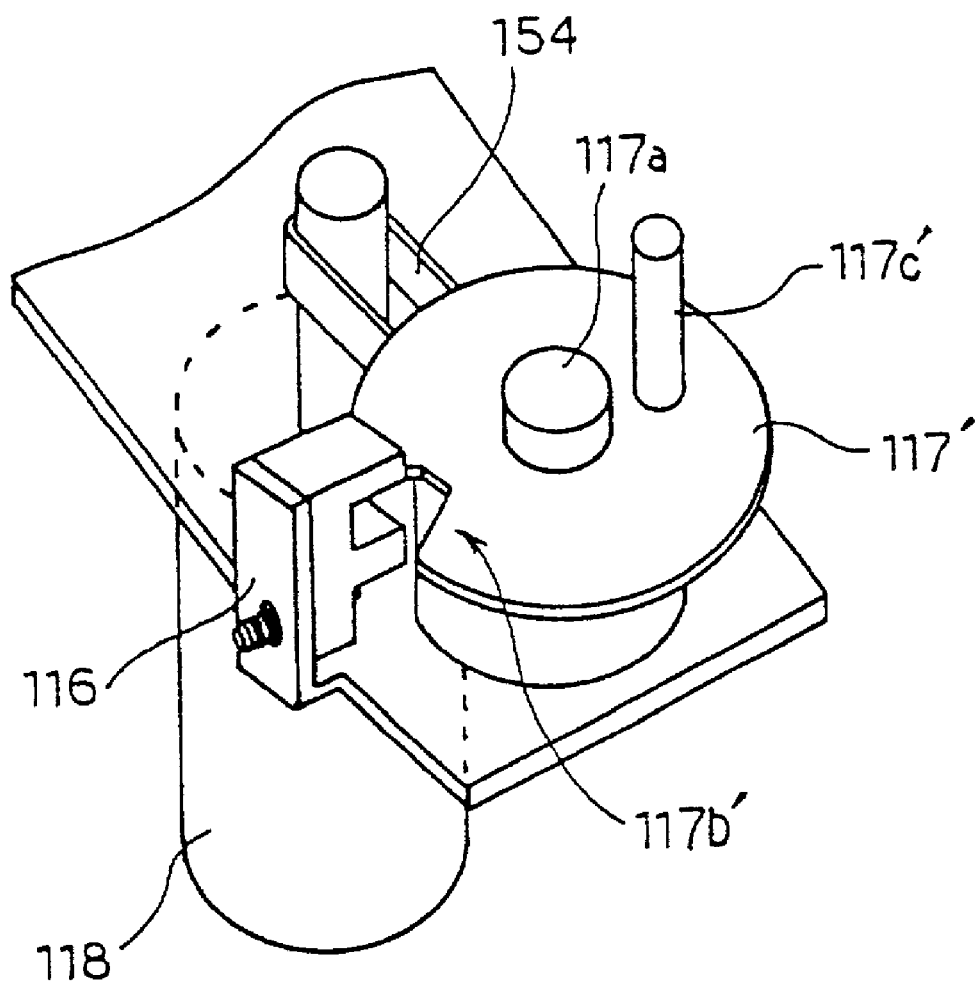
FIG. 21 is a view showing a mechanism for moving the glass platen in the third embodiment of the present invention.

In the illustrative embodiment, the glass platen 110 achieves the same advantages as in the first embodiment when moved to the right. The glass platen 110 has its reading position cleaned by the cleaning member 120 when moved to the left. FIG. 21 shows a specific arrangement for driving the glass platen 110. As shown, a cam 117' has about two times greater diameter than the cam 117 of the first embodiment. A pin 117c' and a notch 117b', which respectively correspond to the pin 117 and notch 117b, are positioned on the cam 117 at radially opposite positions. In this condition, the glass platen 110 is held at the home position.

When the cam 117' is rotated clockwise, as viewed in FIG. 21 from the position shown in FIG. 21, the glass platen 110 is moved to the right. On making one-quarter of a rotation (90°), the cam 117' is rotated in the opposite direction to return the glass platen 110 to the home position. On the other hand, when the cam 117' is rotated counterclockwise, as viewed in FIG. 21, the glass platen 110 moves to the left. On making one-quarter of a rotation (90°), the cam 117' is reversed to return the glass platen 110 to the home position. In this manner, the glass platen 110 is movable back and forth in both directions.

As shown in FIG. 17, the reading position or illuminating position is located at substantially the center of the glass platen 110. The cleaning member 120 is held in contact with the top of one side of the glass platen 110. To clean the glass platen 110, the main controller 41 cause the glass platen 110 to move to the left when, e.g., a given job ends or periodically, e.g., every time a preselected number of documents are read. The cleaning member 120 therefore moves relative to the glass platen 110, providing the glass platen 110 with water repellency or low friction.

As for the movement to the right, the glass platen 110 performs it for every document in the same manner as in the first embodiment.

Fourth Embodiment

Figure 22:
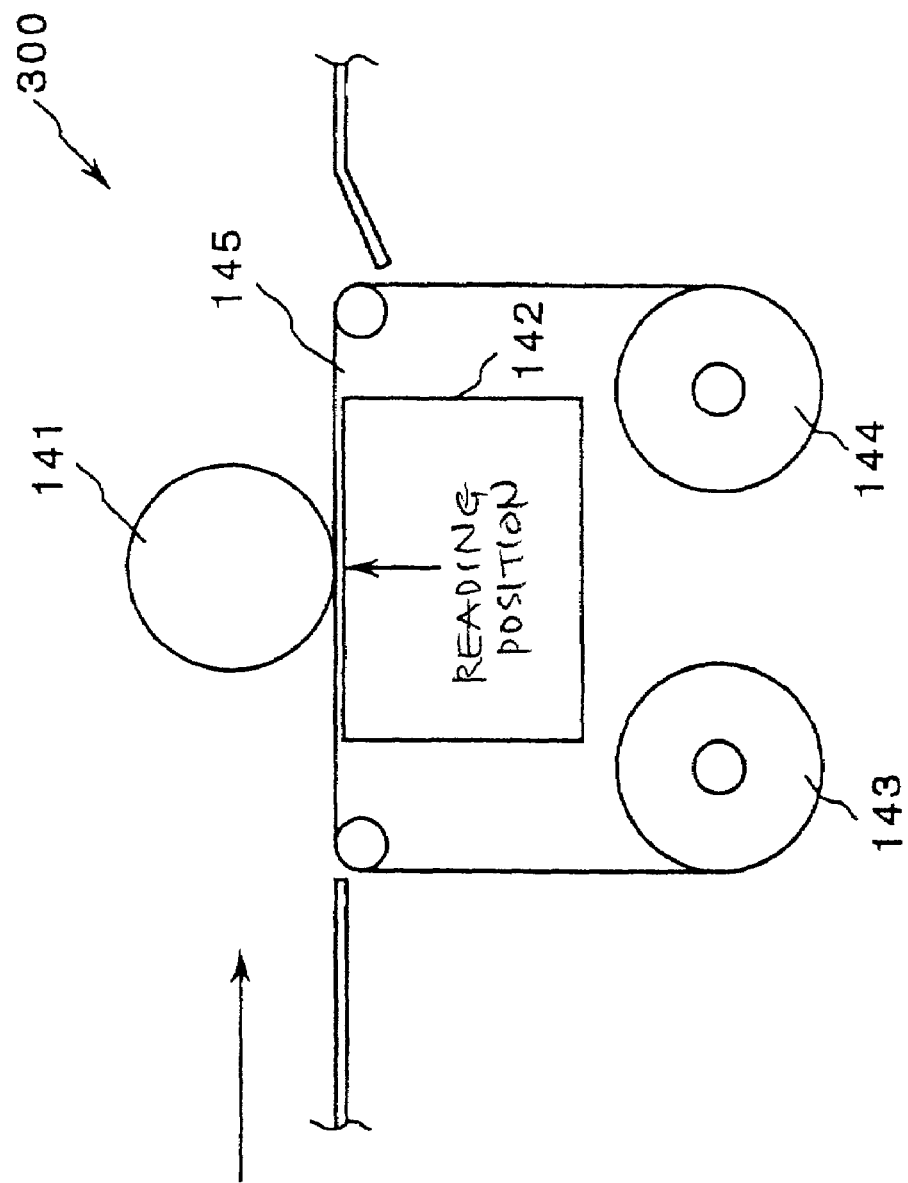
FIG. 22 is a view showing a fourth embodiment of the present invention.

A further embodiment of the present invention will be described with reference to FIG. 22. The illustrative embodiment uses a contact image sensor and a sheet-through system. As shown, an image reading device, generally 300 includes a contact image sensor (CSI) 142. A white press roller 141 presses a document against the image sensor 142. A PET (polyethylene terephthalate) sheet or similar transparent sheet 145 intervenes between the image sensor 142 and the press roller 141. The image sensor 142 reads the image side of a document via the transparent sheet 145.

The transparent sheet 145 is sequentially paid out from a pay-out roller 143 and is taken up by a take-up roller 144 at any suitable period, e.g., every time a preselected number of documents are read. The image sensor 142 can therefore read documents via the fresh portion of the sheet 145 at all times. Also, the image sensor 142 may perform a reading operation with the sheet 145 being sequentially taken up for the detection of contamination. Only when contamination above a preselected level is detected, a new sheet 145 will be used. If the contamination level is lower than the preselected level, the sheet 145 may be rewound and again used.

Because the sheet 145 is sequentially taken up, it does not need any cleaning member. This is also successful to enhance image quality by obviating black stripes or similar detects.

The embodiments shown and described have concentrated on an image reading device including both of the scanning system and sheet-through system. The present invention is, of course, applicable to an image reading device including only the sheet-through system.

The support member 114a, cam 117 and home position sensor 116 constitute moving means. The main controller 41 constitutes control means. The scoop-up guide 15 and flexible member 119 constitute guide means. The contamination detector 124 constitutes contamination detecting means. The operation panel 43 constitutes display means. The pay-out roller 143 constitutes sheet pay-out means while the take-up roller 144 constitutes sheet take-up means.

In summary, it will be seen that the present invention provides an image reading device achieving various unprecedented advantages, as enumerated below.

(1) The image reading device protects an image from black stripes or similar defects and thereby enhances image quality. Particularly, black stripes and other defects ascribable to the contamination of a glass platen are obviated.

(2) The image reading device protects a document from damage and obviates jams.

(3) The image reading device can surely detect the cause of black stripes.

(4) The image reading device maintains the glass platen clean at all times.

(5) The image reading device obviates black stripes and other defects even when contamination cannot be removed by cleaning.

(6) The image reading device promotes easy cleaning of the glass platen.

(7) The image reading device allows a transparent sheet to be rewound and reused while preventing the sheet from damaging a document or causing a document to jam a path.

Various modifications will become possible for those skilled in the art after receiving the teachings of the present disclosure without departing from the scope thereof.

What is claimed is:

1. An image reading device for reading a document being conveyed with a stationary reading section at a reading position on a glass platen, said image reading device comprising:
moving means for moving the glass platen; and
control means for causing said moving means to move said glass platen while the reading section reads an image at the reading position;
wherein the reading position on the glass platen is movable relative to the reading section, wherein
said moving means moves, during an interval between a start and an end of reading of the document, the glass platen from a preselected home position by a preselected stroke and then returns said glass platen to said home position at least one time.

2. The device as claimed in claim 1, wherein said moving means moves the glass platen in a subscanning direction.

3. The device as claimed in claim 1, wherein said control means allows a next document to be fed after the glass platen has returned on the home position.

4. The device as claimed in claim 3, wherein said moving means moves the glass platen in a subscanning direction.

5. The device as claimed in claim 3, further comprising guide means positioned downstream of the glass platen in a direction of document conveyance for scooping up a leading edge of the document.

6. The device as claimed in claim 5, wherein said moving means moves the glass platen in a subscanning direction.

7. The device as claimed in claim 5, wherein said control means causes said moving means to move said glass platen when the leading edge of the document reaches said guide means.

8. The device as claimed in claim 7, wherein said moving means moves the glass platen in a subscanning direction.

9. An image reading device for reading a document being conveyed with a stationary reading section at a reading position on a glass platen, said image reading device comprising:
a white plate positioned above the glass platen for constituting a white reference for reading the document;
moving means for moving the glass platen; and
control means causing said moving means to move said glass platen while the reading section reads an image;
wherein while causing said moving means to move said glass platen, said control means causes said reading section to read an image, determines whether or not contamination is present on the basis of resulting image data, and distinguishes contamination of said glass platen and contamination of said white plate.

10. The device as claimed in claim 9, further comprising contamination detecting means for comparing current image data and immediately preceding image data, determining whether or not contamination is present on the basis of a difference between said current image data and said immediately preceding image data, and determining whether said contamination exists on the glass platen or on said white plate, wherein when said contamination detected by said contamination detecting means exceeds a preselected level, said control means inhibits the reading section from reading an image.

11. The device as claimed in claim 10, wherein said moving means moves the glass platen in a main scanning direction.

12. The device as claimed in claim 10, further comprising display means for displaying an alarm message indicative of the contamination exceeding the preselected level.

13. The device as claimed in claim 12, wherein said moving means moves the glass platen in a main scanning direction.

14. The device as claimed in claim 9, wherein said moving means moves the glass platen in a main scanning direction.

15. An image reading device for reading a document being conveyed with a stationary reading section at a reading position on a glass platen, said image reading device comprising:
a body;
moving means for moving the glass platen; and
cleaning means affixed to said body and contacting the glass platen for cleaning a top of said glass platen;
wherein while said moving means moves the glass platen, said cleaning means moves relative to said glass platen to thereby clean the top of said glass platen.

16. The device as claimed in claim 15, further comprising control means for causing said moving means to move the glass platen while causing the reading section to read an image.

17. The device as claim in claim 16, wherein said cleaning means cleans the top of the glass platen periodically.

18. The device as claimed in claim 16, wherein said control means causes said moving means to move the glass platen in one direction for reading an image and to move said glass platen in the other direction opposite to said one direction for cleaning the top of said glass platen.

19. The device as claim in claim 18, wherein said cleaning means cleans the top of the glass platen periodically.

20. The device as claimed in claim 15, wherein said cleaning means is coated with a water-repellent agent or impregnated with a low-friction agent.

21. The device as claim in claim 20, wherein said cleaning means cleans the top of the glass platen periodically.

22. The device as claim in claim 15, wherein said cleaning means cleans the top of the glass platen periodically.

23. An image reading device for reading a document being conveyed with a stationary reading section at a reading position on a glass platen, said image reading device comprising:
a contact image sensor for reading an image;
a press roller for conveying a document while pressing said document against said contact image sensor, and constituting a white reference;
sheet pay-out means for paying out a transparent sheet held between said contact image sensor and said press roller and used to lay the document thereon;
sheet take-up means for taking up the transparent sheet paid out; and
control means for causing said sheet pay-out means to pay out the transparent sheet during reading of the document;
wherein said control means causes said contact image sensor and a reading position of the transparent sheet to move relative to each other while causing the reading section to read an image.

24. The device as claimed in claim 23, wherein said sheet pay-out means causes the transparent sheet to move in a subscanning direction.

25. The device as claimed in claim 23, wherein said control means causes said sheet pay-out means to move the transparent sheet while causing the reading section to read an image, determines whether or not contamination exists on the basis of resulting image data, and determines whether said contamination exists on the transparent sheet or on said press roller.

26. The device as claimed in claim 25, wherein said sheet pay-out means causes the transparent sheet to move in a subscanning direction.

27. An image reading device for reading a document being conveyed with a stationary reading section at a reading position on a glass platen, said image reading device comprising:
a moving device for moving the glass platen; and
a controller for causing said moving device to move said glass platen while the reading section reads an image, wherein
the reading position on the glass platen is movable relative to the reading section; and
said moving device moves, during an interval between a start and an end of reading of the document, the glass platen from a preselected home position by a preselected stroke and then returns said glass platen to said home position at least one time.

28. The device as claimed in claim 27, wherein said moving device moves the glass platen in a subscanning direction.

29. The device as claimed in claim 27, wherein said controller allows a next document to be fed after the glass platen has returned on the home position.

30. The device as claimed in claim 29, wherein said moving device moves the glass platen in a subscanning direction.

31. The device as claimed in claim 29, further comprising a guide positioned downstream of the glass platen in a direction of document conveyance for scooping up a leading edge of the document.

32. The device as claimed in claim 31, wherein said moving device moves the glass platen in a subscanning direction.

33. The device as claimed in claim 31, wherein said controller causes said moving device to move said glass platen when the leading edge of the document reaches said guide.

34. The device as claimed in claim 33, wherein said moving device moves the glass platen in a subscanning direction.

35. An image reading device for reading a document being conveyed with a stationary reading section at a reading position on a glass platen, said image reading device comprising:
a white plate positioned above the glass platen for constituting a white reference for reading the document;
a moving device for moving the glass platen; and
a controller for causing said moving device to move said glass platen while the reading section reads an image;
wherein while causing said moving device to move said glass platen, said controller causes said reading section to read an image, determines whether or not contamination is present on the basis of resulting image data, and distinguishes contamination of said glass platen and contamination of said white plate.

36. The device as claimed in claim 35, further comprising a contamination detecting circuit for comparing current image data and immediately preceding image data, determining whether or not contamination is present on the basis of a difference between said current image data and said immediately preceding image data, and determining whether said contamination exists on the glass platen or on said white plate, wherein when said contamination detected by said contamination detecting circuit exceeds a preselected level, said controller inhibits the reading section from reading an image.

37. The device as claimed in claim 36, wherein said moving device moves the glass platen in a main scanning direction.

38. The device as claimed in claim 36, further comprising a display for displaying an alarm message indicative of the contamination exceeding the preselected level.

39. The device as claimed in claim 38, wherein said moving device moves the glass platen in a main scanning direction.

40. The device as claimed in claim 35, wherein said moving device moves the glass platen in a main scanning direction.

41. An image reading device for reading a document being conveyed with a stationary reading section at a reading position on a glass platen, said image reading device comprising:
a body;
a moving device for moving the glass platen; and
a cleaning member affixed to said body and contacting the glass platen for cleaning a top of said glass platen;
wherein while said moving device moves the glass platen, said cleaning member moves relative to said glass platen to thereby clean the top of said glass platen.

42. The device as claimed in claim 41, further comprising a controller for causing said moving device to move the glass platen while causing the reading section to read an image.

43. The device as claim in claim 42, wherein said cleaning member cleans the top of the glass platen periodically.

44. The device as claimed in claim 42, wherein said controller causes said moving member to move the glass platen in one direction for reading an image and to move said glass platen in the other direction opposite to said one direction for cleaning the top of said glass platen.

45. The device as claim in claim 44, wherein said cleaning member cleans the top of the glass platen periodically.

46. The device as claimed in claim 41, wherein said cleaning member is coated with a water-repellent agent or impregnated with a low-friction agent.

47. The device as claim in claim 46, wherein said cleaning member cleans the top of the glass platen periodically.

48. The device as claim in claim 41, wherein said cleaning member cleans the top of the glass platen periodically.

49. An image reading device for reading a document being conveyed with a stationary reading section at a reading position on a glass platen, said image reading device comprising:
a contact image sensor for reading an image;
a press roller for conveying a document while pressing said document against said contact image sensor, and constituting a white reference;
a sheet pay-out member for paying out a transparent sheet held between said contact image sensor and said press roller and used to lay the document thereon;
a sheet take-up member for taking up the transparent sheet paid out; and
a controller for causing said sheet pay-out member to pay out the transparent sheet during reading of the document;
wherein said controller causes said contact image sensor and a reading position of the transparent sheet to move relative to each other while causing the reading section to read an image.

50. The device as claimed in claim 49, wherein said sheet pay-out member causes the transparent sheet to move in a subscanning direction.

51. The device as claimed in claim 49, wherein said controller causes said sheet pay-out member to move the transparent sheet while causing the reading section to read an image, determines whether or not contamination exists on the basis of resulting image data, and determines whether said contamination exists on the transparent sheet or on said press roller.

52. The device as claimed in claim 51, wherein said sheet pay-out means causes the transparent sheet to move in a subscanning direction.

* * * * *